US012191573B2

(12) United States Patent
Zhang et al.

(10) Patent No.: US 12,191,573 B2
(45) Date of Patent: Jan. 7, 2025

(54) ANTENNA APPARATUS AND ELECTRONIC DEVICE

(71) Applicants: XIDIAN UNIVERSITY, Shaanxi (CN); GUANGDONG OPPO MOBILE TELECOMMUNICATIONS CORP., LTD., Guangdong (CN)

(72) Inventors: Shuai Zhang, Guangdong (CN); Nan Huang, Guangdong (CN); Zhengdong Yong, Guangdong (CN); Bao Lu, Guangdong (CN)

(73) Assignees: XIDIAN UNIVERSITY, Xi'an (CN); GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 252 days.

(21) Appl. No.: 17/985,551

(22) Filed: Nov. 11, 2022

(65) Prior Publication Data

US 2023/0062082 A1 Mar. 2, 2023

Related U.S. Application Data

(63) Continuation of application No. PCT/CN2021/088833, filed on Apr. 22, 2021.

(30) Foreign Application Priority Data

May 12, 2020 (CN) ......................... 202010399374.0
May 12, 2020 (CN) ......................... 202020781746.1

(51) Int. Cl.
*H01Q 21/08* (2006.01)
*H01Q 1/24* (2006.01)
(Continued)

(52) U.S. Cl.
CPC ............ *H01Q 21/08* (2013.01); *H01Q 1/243* (2013.01); *H01Q 1/523* (2013.01); *H01Q 9/0414* (2013.01)

(58) Field of Classification Search
CPC ...... H01Q 1/2283; H01Q 1/243; H01Q 1/521; H01Q 1/523; H01Q 9/0414; H01Q 21/08; H01L 2223/6677
See application file for complete search history.

(56) References Cited

U.S. PATENT DOCUMENTS

2010/0248651 A1 9/2010 Dent
2016/0006119 A1* 1/2016 Wu ........................ H01Q 1/523
343/853
(Continued)

FOREIGN PATENT DOCUMENTS

CN 102104185 A 6/2011
CN 102280695 A 12/2011
(Continued)

OTHER PUBLICATIONS

Y.-M. Zhang, S. Zhang, J.-L. Li and G. F. Pedersen, "A Transmission-Line-Based Decoupling Method for MIMO Antenna Arrays," in IEEE Transactions on Antennas and Propagation, vol. 67, No. 5, pp. 3117-3131, May 2019, doi: 10.1109/TAP.2019.2900406. (Year: 2019).*
(Continued)

*Primary Examiner* — Dameon E Levi
*Assistant Examiner* — Leah Rosenberg
(74) *Attorney, Agent, or Firm* — Young Basile Hanlon & MacFarlane, P.C.

(57) ABSTRACT

Provided are an antenna apparatus and an electronic device. The antenna apparatus comprises a plurality of antenna units, spaced from each other; a plurality of decoupling networks, corresponding to the plurality of antenna units one
(Continued)

to one; and a decoupling transmission line. Each of the decoupling networks comprises a first transmission line and a second transmission line; an end of the first transmission line is configured to be connected to a radio-frequency chip, the other end of the first transmission line is connected to an end of the second transmission line, a decoupling port is formed at a joint between the other end of the first transmission line and the end of the second transmission line, and the other end of the second transmission line is connected to a corresponding antenna unit; and the decoupling transmission lines is connected between adjacent decoupling ports. The electronic device comprises the antenna apparatus.

19 Claims, 12 Drawing Sheets

(51) Int. Cl.
*H01Q 1/52* (2006.01)
*H01Q 9/04* (2006.01)

(56) References Cited

U.S. PATENT DOCUMENTS

| | | | | |
|---|---|---|---|---|
| 2018/0076526 | A1* | 3/2018 | Garcia | H01Q 19/30 |
| 2019/0020110 | A1* | 1/2019 | Paulotto | H01Q 5/392 |
| 2021/0021018 | A1* | 1/2021 | Yoon | H01Q 1/243 |
| 2022/0278440 | A1* | 9/2022 | Kim | H01Q 1/521 |

FOREIGN PATENT DOCUMENTS

| | | | |
|---|---|---|---|
| CN | 203445240 | U | 2/2014 |
| CN | 103855469 | A | 6/2014 |
| CN | 104283007 | A | 1/2015 |
| CN | 104756316 | A | 7/2015 |
| CN | 108428998 | A | 8/2018 |
| CN | 208173791 | U | 11/2018 |
| CN | 109861008 | A | 6/2019 |
| CN | 212277387 | U | 1/2021 |
| EP | 0044456 | A1 | 1/1982 |
| JP | 2013172172 | A | 9/2013 |

OTHER PUBLICATIONS

Zhang et al., A Transmission-Line-Based Decoupling Method for MIMO Antenna Arrays? IEEE Transactions on Antennas and Propagation, vol. 67, Issue 5; May 31, 2019; Main text, Figures 2-3, 11-12, 21; 1-12,17-20, 16 pgs.

Zhang et al, A Simple and Wideband Decoupling Method for Antenna Array Applications? 2020 International Workshop on Antenna Technology (IWAT); May 4, 2020, Full text; 1-20, 4 pgs.

Li et al.,Decoupling Network Comprising Transmission Lines and Bridge Resistance for Two-element Array Antenna? Procedures of APMC 2012; Dec. 7, 2012; Full text; 1-20; 3 pgs.

Wang et al., Design and research of decoupling structure for microstrip patch antenna based on 5G communication frequency band; Journal of Changchun University of Science and Technology (Natural Science Edition), vol. 43, Issue 2; Apr. 30, 2020; Full text; 1-20, 16 pgs.

Zhang et al.?Calculating mutual coupling between microstrip antennas using hybrid model method; Journal of Microwave Science, vol. 20, Issue 3; Sep. 30, 2004; Full text; 1-20, 17 pgs.

Chinese First Office Action for Chinese Application No. 202010399374.0, mailed Apr. 3, 2024, 19 pages.

Chinese Notification to Grant Patent Right for Invention for Chinese Application No. 202010399374.0, mailed Jun. 28, 2024, 6 pages.

Extended European Search Report for EP Application 21803835.4 mailed Oct. 11, 2023. (16 pages).

Zhang et al., "A Transmission-line-Based Decoupling Methodfor MIMO Antenna Arrays", IEEE Transactions on Antennas and Propagation,IEEE,USA, vol. 67, No. 5, May 1, 2019 (May 1, 2019) ,pp. 3117-3131, XP011722881, ISSN: 0018-926X,DOI : 10.1109/TAP . 2019.2900406 [retrieved on May 2, 2019] * Sections I.-V.; figures 1-22*.

Zou et al., "An Efficient Decoupling Network Between reeding Pointsfor Multielement Linear Arrays", IEEE Transactions on Antennas Andpropagation, IEEE, USA, vol. 67, No. 5, May 1, 2019 (May 1, 2019) , pp. 3101-3108, XP011722898, ISSN: 0018-926X,DOI: 10.1109/TAP . 2019.2899039 [retrieved on May 2, 2019] * Section II.-III.; figures 1-3 *.

Xia et al., "An Efficient Decoupling Feeding Network for Microstrip Antenna Array", IEEE Antennas and Wireless Propagation Letters,IEEE,Piscataway, NJ, US, vol. 14, Dec. 18, 2014 (Dec. 18, 2014),pp. 871-874,XP011577467, ISSN: 1536-1225,DOI; 10.1109/LAWP . 2014.2380786 [retrieved on Apr. 3, 2015] * Sections I. and II.; figures 1-4 *.

International Search Report and Written Opinion with English Translation for PCT Application PCT/CN2021/088833 mailed Jul. 7, 2021 (14 pages).

Guha et al,"Concentric Ring-Shaped Defected Ground Structures for Microstrip Applications", IEEE Antennas And Wireless Propagation Letters, vol. 5, Sep. 13, 2006, (402-405 pages).

Wei et al,"Mutual Coupling Reduction by Novel Fractal Defected Ground Structure Band-gap Filter", IEEE Transactions on Antennas and Propagation, vol. 64, Issue 10, Oct. 2016. (8 pages).

Ban et al,"Decoupled Planar WWAN Antennas With T-Shaped Protruded Ground for Smartphone Applications", IEEE Antennas and Wireless Propagation Letters, vol. 13, Mar. 17, 2014. (483-486 pages).

Shoaib et al,"Design and Performance Study of a Dual-Element Multiband Printed Monopole Antenna Array for MIMO Terminals", IEEE Antennas and Wireless Propagation Letters, vol. 13, Feb. 11, 2014. (329-332 pages).

Diallo et al," Study and Reduction of the Mutual Coupling Between Two Mobile Phone PIFAs Operating in the DCS 1800 and UMTS Bands", IEEE Transactions on Antennas and Propagation, vol. 54, Issue 11, Nov. 2006. (3063-3074 pages).

Ban et al,"Decoupled Hepta-Band Antenna Array for WWAN/LTE Smartphone Applications", IEEE Antennas and Wireless Propagation Letters, vol. 13, May 23, 2014. (999-1002 pages).

Wu et al,"Stub-Loaded Reactive Decoupling Network for Two-Element Array Using Even-Odd Analysis", IEEE Antennas and Wireless Propagation Letters, vol. 12, Mar. 27, 2013. (452-455 pages).

Wu et al,"Very Compact Fully Lumped Decoupling Network for a Coupled Two-Element Array", IEEE Antennas and Wireless Propagation Letters, vol. 15, 2016. (158-161 pages).

Farsi et al,"Mutual Coupling Reduction Between Planar Antennas by Using a Simple Microstrip U-Section", IEEE Antennas and Wireless Propagation Letters, vol. 11, Dec. 19, 2012. (1501-1503 pages).

Vishvaksenan et al,"Mutual Coupling Reduction in Microstrip Patch Antenna Arrays Using Parallel Coupled-Line Resonators", IEEE Antennas and Wireless Propagation Letters, vol. 16, May 3, 2017. (4 pages).

Sievenpiper et al,"High-impedance electromagnetic surfaces with a forbidden frequency band", IEEE Transactions on Microwave Theory and Techniques, vol. 47, Issue 11, Nov. 1999. (2059-2074 pages).

Farahani et al,"Mutual Coupling Reduction in Patch Antenna Arrays Using a UC-EBG Superstrate", IEEE Antennas and Wireless Propagation Letters, vol. 9, Feb. 8, 2010. (57-59 pages).

Yang et al,"Isolation Enhancement in Patch Antenna Array with Fractal UC-EBG Structure and Cross Slot", IEEE Antennas and Wireless Propagation Letters, vol. 16, May 10, 2017. (4 pages).

Pendry et al,"Extremely Low Frequency Plasmons in Metallic Mesostructures", Physical Review Letters, vol. 76, No. 25, Jun. 17, 1996. (4773-4776 pages).

Bait-Suwailam et al,"Mutual Coupling Reduction Between Microstrip Patch Antennas Using Slotted-Complementary Split-Ring Resonators", IEEE Antennas and Wireless Propagation Letters, vol. 9, Sep. 7, 2010. (876-878 pages).

(56) References Cited

OTHER PUBLICATIONS

Qamar et al,"Mutual Coupling Reduction for High-Performance Densely Packed Patch Antenna Arrays on Finite Substrate", IEEE Transactions on Antennas and Propagation, vol. 64, Issue 5, May 2016. (9 pages).

Jafargholi et al,"Mutual Coupling Reduction in an Array of Patch Antennas Using CLL Metamaterial Superstrate for MIMO Applications", IEEE Transactions on Antennas and Propagation, vol. 67, Issue 1, Jan. 2019. (11 pages).

Wu et al,"Array-antenna Decoupling Surface", IEEE Transactions on Antennas and Propagation, vol. 65, Issue 12, Dec. 2017. (12 pages).

* cited by examiner

ANTENNA APPARATUS AND ELECTRONIC DEVICE

CROSS-REFERENCE TO RELATED APPLICATION(S)

The present disclosure is a continuation of International (PCT) Patent Application No. PCT/CN2021/088833 filed on Apr. 22, 2021, which claims the priorities to Chinese Patents Application No. 202010399374.0 and No. 202020781746.1, both filed on May 12, 2020, the contents of all of which are hereby incorporated by reference in their entireties.

TECHNICAL FIELD

The present disclosure relates to antenna decoupling, and in particular to an antenna apparatus, and an electronic device including the antenna apparatus.

BACKGROUND

An antenna may efficiently transmit and receive electromagnetic waves, and is an indispensable part of a wireless communication system. However, with an advancement of the science and technology, it is difficult for a single antenna to meet increasing requirements for performances. In order to improve a problem of a poor directivity and a low radiation gain of a single antenna unit, several antennas having the same radiation characteristics may be arranged according to a certain geometric structure to form an array antenna, such that radiation performances of the antennas may be improved and a more flexible direction map may be generated, so as to satisfy requirements of various scenarios.

SUMMARY

According to a first aspect of the present disclosure, an antenna apparatus is provided and includes multiple antenna units spaced from each other, multiple decoupling networks, and a decoupling transmission line; the multiple decoupling networks corresponds to the multiple antenna units one to one, each of the decoupling networks includes a first transmission line and a second transmission line; an end of the first transmission line is configured to be connected to a radio frequency (RF) chip; and the other end of the first transmission line is connected to an end of the second transmission line, a decoupling port is formed at a joint between the other end of the first transmission line and the end of the second transmission line, and the other end of the second transmission line is connected to a corresponding antenna unit; and the decoupling transmission line is connected between adjacent decoupling ports; a length of the decoupling transmission line being determined based on a phase of an initial isolation degree between each two adjacent antenna units of the plurality of antenna units, and the initial isolation degree being an isolation degree when the adjacent antenna units are not connected to the decoupling networks.

According to a second aspect of the present disclosure, an electronic device is provided and includes a housing, a display screen assembly, an RF chip, and an antenna apparatus; the display screen assembly is connected to the housing, and an accommodating space is defined by the housing and the display screen assembly; the RF chip is arranged in the accommodating space; the antenna apparatus is at least partially arranged in the accommodating space and includes multiple antenna units spaced from each other, multiple decoupling networks, and a decoupling transmission line; the multiple decoupling networks corresponds to the multiple antenna units one to one, each of the decoupling networks includes a first transmission line and a second transmission line; an end of the first transmission line is configured to be connected to the RF chip; and the other end of the first transmission line is connected to an end of the second transmission line, a decoupling port is formed at a joint between the other end of the first transmission line and the end of the second transmission line, and the other end of the second transmission line is connected to a corresponding antenna unit; and the decoupling transmission line is connected between adjacent decoupling ports.

BRIEF DESCRIPTION OF DRAWINGS

In order to more clearly describe the technical solutions in the embodiments of the present disclosure, the following will briefly introduce the drawings required in the description of the embodiments. Obviously, the drawings in the following description are only some embodiments of the present disclosure. For those skilled in the art, other drawings can be obtained based on these drawings without creative work.

DETAILED DESCRIPTION

Figure 1:
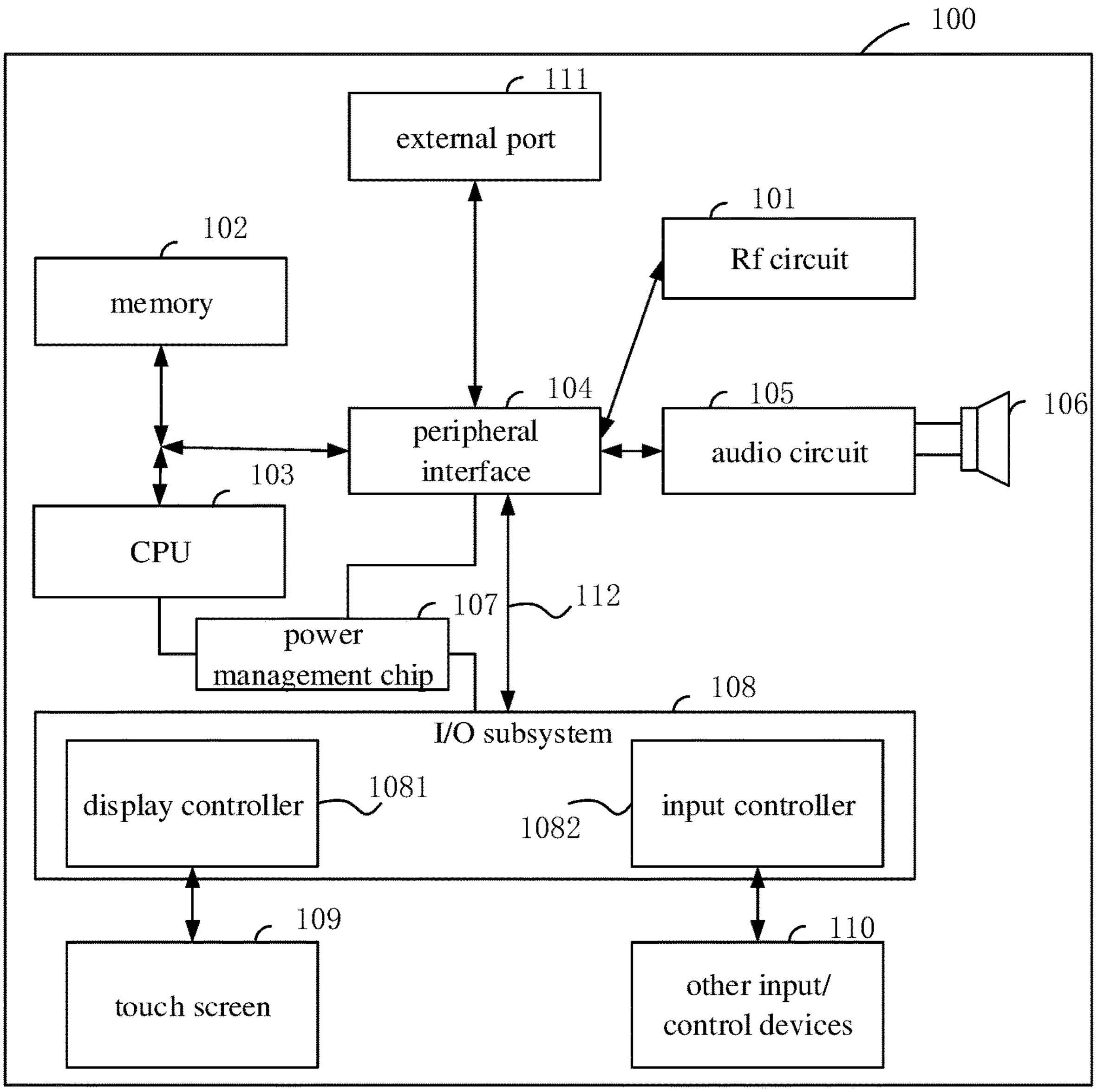
FIG. 1 is a structural schematic view of an electronic device according to some embodiments of the present disclosure.

The technical solutions in the embodiments of the present disclosure will be clearly and completely described in the following with reference to the drawings in the embodiments of the present disclosure. Obviously, the embodiments described are only a part of the embodiments of the present disclosure, but not all of the embodiments. Based on the embodiments in the present disclosure, all other embodiments obtained by those of ordinary skill in the art without creative efforts shall fall within a protection scope of the present disclosure.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

An array antenna, especially a small-pitch array antenna, has a problem of a strong mutual coupling. The mutual coupling among antenna units affects matching characteristics and spatial radiation characteristics of the antenna units and their array to a large extent, which may involve the following aspects.

(1) Direction map: a distribution of a current in an antenna may vary under an action of the mutual coupling, resulting in a part of radiation energy, i.e., coupling energy, being further coupled to other antenna units. A part of the coupling energy may be consumed by a termination load, while another part of the coupling energy may be radiated again. Therefore, the direction map of the antenna may be distorted. The termination load described herein is a parameter being equivalent from a rear end of an antenna feed source. When an equivalent circuit is drawn, an entire rear end of the antenna feed source may be replaced by a resistor, which may be called as the termination load.

(2) Input impedance: input impedances of the antenna units in the array may be changed under an influence of the mutual coupling and be different from the input impedance of an antenna unit in an isolated environment. Therefore, matching conditions of the antenna units in each array may be different and the matching characteristics may be affected.

(3) Gain: a reflection loss caused by an impedance mismatch and a heat loss may exist in the antenna unit, such that a radiation power of the antenna is less than a transmitted power. The reflection coefficient may be changed under the action of the mutual coupling, such that the gain of the antenna may be affected.

In the related art, the following five methods may be usually configured to solve influences of a mutual coupling effect on characteristics of the antenna, such as the direction map, the input impedance, the gain, or the like. The five methods may include a Defected Ground Structure (DGS), a Neutralization Line Technique (NLT) decoupling method, a band-stop filter decoupling method, an Electromagnetic Band Gap (EBG) decoupling method, a Metamaterial Decoupling Technique (MDT) decoupling method.

However, the above five methods are all researches on a method of eliminating the mutual coupling between the antenna units, and fail to precisely define and control a coupling effect between the antennas.

An electronic device is provided in the present disclosure. The array antenna of the electronic device may have a self-definition for the coupling effect between the antennas and have a control for radiation direction maps of the antenna units based on a design for the coupling effect. The control may include widening a scanning angle, improving a scanning gain, and eliminate scanning blind portions, etc.

The electronic device may be a terminal device such as a mobile phone, a tablet computer, a Personal Digital Assistant (PDA), a Point of Sales (POS), a vehicle-mounted computer, or a Customer Premise Equipment (CPE). The present disclosure will be described in the following with the mobile phone as an example.

As shown in FIG. 1, the mobile phone 100 may include a Radio Frequency (RF) circuit 101, a memory 102, a Central Processing Unit (CPU) 103, a peripheral interface 104, an audio circuit 105, a speaker 106, and a power management chip 107, an input/output (I/O) subsystem 108, a touch screen 109, other input/control devices 110, and an external port 111. These components may communicate through one or more communication buses or signal lines 112.

It should be understood that the mobile phone illustrated is only an example of the electronic device. The mobile phone 100 may have more or fewer components than those shown in the FIG. 1, may combine two or more components, or may have different component configurations. Various components shown in the FIG. 1 may be implemented in a hardware, a software, or a combination of the hardware and the software, including one or more signal processing circuits and/or application specific integrated circuits.

The various components of the mobile phone may be described in detail with reference to FIG. 1 in the following.

The RF circuit 101 is configured to establish a communication between the mobile phone and a wireless network (i.e., a network side), and realize a data reception and a data transmission between the mobile phone and the wireless network, such as sending and receiving a text message, an e-mail, etc. Specifically, the RF circuit 101 may receive and transmit a RF signal which is also called an electromagnetic signal. The RF circuit 101 may convert an electrical signal into the electromagnetic signal or convert the electromagnetic signal into the electrical signals, and communicate with communication with a communication network and other devices by means of the electromagnetic signal. The RF circuit 101 may include a known circuit for performing these functions including but not limited to, an antenna system having the antenna array, a RF transceiver, one or more amplifiers, a tuner, one or more oscillators, a digital signal processing device, a CODEC (Coder-DECoder) chipset, Subscriber Identity Module (SIM), or the like.

The memory 102 may be accessed by the CPU 103, the peripheral interface 104, etc. The memory 102 may include a high-speed random access memory, and may also include a non-volatile memory, such as one or more disk storage devices, a flash memory device, or other volatile solid storage devices.

The CPU 103 may perform various functional applications and data processing of the electronic device through running a software program and a module stored in the memory 102.

The peripheral interface 104 may connect input and output peripherals of the electronic device to the CPU 103 and the memory 102.

The I/O subsystem 108 may connect the input and output peripherals of the electronic device, such as the touch screen 109 and the other input/control devices 110, to the peripheral interface 104. The I/O subsystem 108 may include a display controller 1081 and one or more input controllers 1082 for controlling the other input/control devices 110. The one or more input controllers 1082 may receive electrical signals from the other input/control devices 110 or send the electrical signals to the other input/control devices 110. The other input/control devices 110 may include physical buttons (push buttons, rocker buttons, etc.). dial pads, slide switches, joysticks, and click wheels. It is worth of being noted, the input controller 1082 may be connected to any of a keyboard, an infrared port, a USB interface, and a pointing device such as a mouse.

The touch screen 109 is an input interface and an output interface between a user terminal and a user, and may display a visual output to the user. The visual output may include a graphic, a text, an icon, a video, or the like.

The display controller 1081 in the I/O subsystem 108 may receive the electrical signal from the touch screen 109 or send the electrical signal to the touch screen 109. The touch screen 109 may detect a contact on the touch screen. The display controller 1081 may convert the contact detected into an interaction with a user interface object displayed on the touch screen 109, i.e., realizing a human-computer interaction. The user interface object displayed on the touch screen 109 may be an icon for running a game, an icon for accessing into a corresponding network, etc. It is worth noting that the device may also include a light mouse. The light mouse may be a touch-sensitive surface which does not display the visual output, or an extension of the touch-sensitive surface formed by the touch screen.

The audio circuit 105 is configured to receive audio data from the peripheral interface 104, convert the audio data into the electrical signal, and sending the electrical signal to the speaker 106.

The speaker 106 is configured to restore a voice signal received by the mobile phone 100 from the wireless network through the RF circuit 101 into a sound and play the sound to the user.

The power management chip 107 is configured to perform a power supply and a power management for the hardware connected to the CPU 103, I/O subsystem 108, and the peripheral interface 104.

The array antenna in the antenna system of the RF circuit 101 of the electronic device is described in the following. The array antenna may include multiple antenna units arranged closely. In at least two adjacent antenna units, each of the antenna units is connected to a feed source through a matching network. In the present disclosure, "multiple" or "more" may indicate at least two, for example, two, three or the like, unless otherwise a specific limitation is made.

Figure 2:
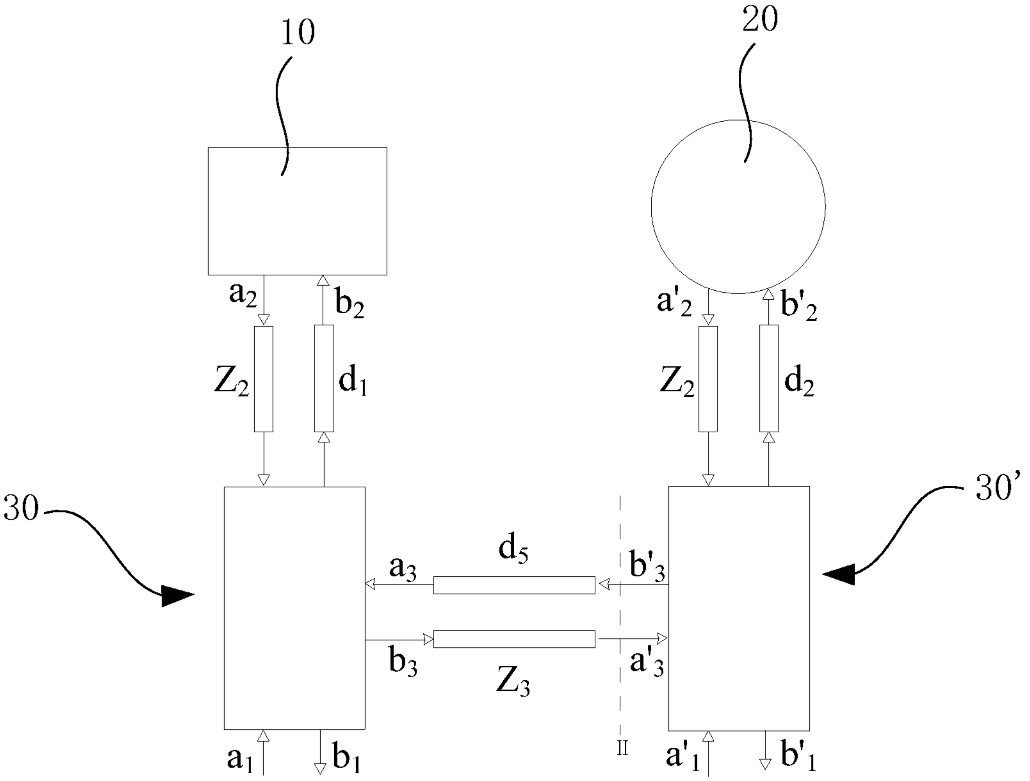
FIG. 2 is a schematic diagram of a decoupling principle of an array antenna according to some embodiments of the present disclosure.

Two adjacent antenna units including an antenna unit 10 and an antenna unit 20 are taken as an example in the present embodiment to introduce the present disclosure. The antenna unit 10 may be referred to as the first antenna unit 10 and the antenna unit 20 may be referred to as the second antenna unit 20. As shown in FIG. 2, the antenna unit 10 is adjacent to the antenna unit 20. The radiation characteristics of the antenna unit 10 may be the same with those of the antenna unit 20, or may be different from those of the antenna unit 20. The antenna unit 10 may receive an excitation current from the feed source (the RF transceiver) of the electronic device. After an amplification process, a filtering process, a matching and tuning process, the excitation current may excite the antenna unit 10 to be resonated at a corresponding frequency, such that an electromagnetic wave signal of the corresponding frequency may be generated. The electromagnetic wave signal is coupled to an electromagnetic wave signal having the same frequency in a free space, so as to achieve a signal transmission. Under an excitation action of an excitation signal, the antenna unit 10 may also be resonated to an antenna unit having the corresponding frequency and coupled to the electromagnetic wave signal having the same frequency from the free space, such that an induction current may be generated on the antenna unit 10. The induction current may enter into the RF transceiver after the filtering process and the amplification process.

The array antenna may also include a decoupling structure. The decoupling structure may include a decoupling network and a decoupling transmission line connected to the decoupling network. A first decoupling network 30 may correspond to the antenna unit 10 and a second decoupling network 30' may correspond to the antenna unit 20 adjacent to the antenna unit 10. The first decoupling network 30 may be connected to the second decoupling network 30'. Both the first decoupling network 30 and the second decoupling network 30' are three-port networks. The first decoupling network 30 may have a first input port ($a_1$, $b_1$) configured to be connected to the feed source, a first output port ($a_2$, $b_2$) configured to be connected to the antenna unit 10, and a first decoupling port ($a_3$, $b_3$) configured to be connected to the second decoupling network 30'. The second decoupling network 30' may have a second input port ($a'_1$, $b'_1$) configured to be connected to the feed source, a second output port ($a'_2$, $b'_2$) configured to be connected to connected to the antenna unit 20, and a second decoupling port ($a'_3$, $b'_3$) configured to be connected to the first decoupling network 30. The $a_1$, $a_2$, $a_3$, $a'_1$, $a'_2$ and $a'_3$ are amplitudes of incident voltage waves, and the $b_1$, $b_2$, $b_3$, $b'_1$, $b'_2$ and $b'_3$ are amplitudes of reflected voltage waves. It is worth of being mentioned that terms "input port(s)" and "output port(s)" in the embodiments of the present disclosure are only named from a perspective of the antenna unit 10 transmitting the signal. It can be understood that the antenna unit 10 may also receive the signal. At this case, the above-mentioned "output port(s)" may be configured to be the "input port(s)", and the above-mentioned "input port(s)" may be configured to be the "output port(s)". That is, the terms "input port(s)" and "output port(s)" in the present disclosure does not limit properties of these ports. A transmission line having a length $d_1$ in FIG. 2 may form the first output port ($a_2$, $b_2$) and have an impedance $Z_2$. A transmission line having a length $d_2$ may form the second output port ($a'_2$, $b'_2$) and have an impedance $Z_2$. d1 may be equal to d2. The decoupling transmission line having a length $d_5$ may be connected to the first decoupling port ($a_3$, $b_3$) of the first decoupling network 30 and the second decoupling port ($a'_3$, $b'_3$) of the second decoupling network 30', and have an impedance $Z_3$. The first decoupling network 30 and the decoupling transmission line may form a first power divider, such that a power input from the first input port ($a_1$, $b_1$) of the first decoupling network 30 may be distributed to the first antenna unit 10 and the decoupling transmission line based on a power division ratio of the first power divider. The second decoupling network 30' and the decoupling transmission line may form a second power divider, such that a power input from the second input port ($a'_1$, $b'_1$) of the second decoupling network 30' may be distributed to the second antenna unit 20 and the decoupling transmission line based on a power division ratio of the second power divider. In this way, the mutual coupling between the first antenna unit 10 and the second antenna unit 20 may be offset.

It should be pointed out that a transmission line having the impedance $Z_2$ is shown in a side of the transmission line having the length $d_1$ in FIG. 2. These two transmission lines may correspond to the same wire in kind. Similarly, the transmission line having the length $d_2$ and the decoupling transmission line having the length $d_5$ should also be understood in a same way.

Figure 3:
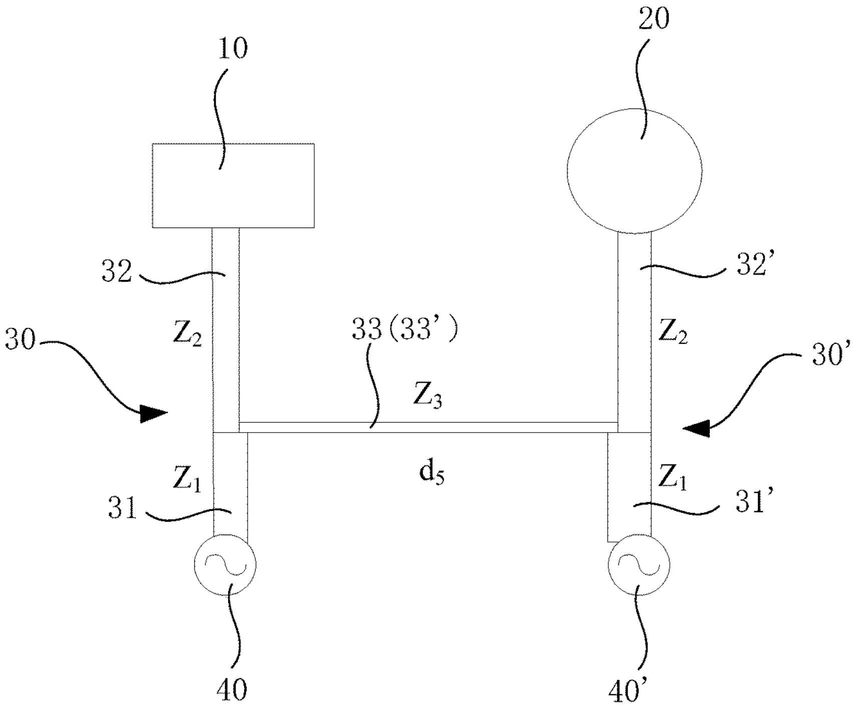
FIG. 3 is a structural schematic diagram of the array antenna according to some embodiments of the present disclosure.

As shown in FIG. 3, FIG. 3 is a schematic diagram of a decoupling structure applied to the array antenna according to some embodiments of the present disclosure. The decoupling structure applied to the array antenna in the present disclosure may at least include the first decoupling network 30, the second decoupling network 30' and the decoupling transmission line 33 connected between the first decoupling network 30 and the second decoupling network 30'. In addition, the antenna apparatus of the present disclosure may include the decoupling structure and the array antenna connected to the decoupling structure.

The first decoupling network 30 corresponding to the antenna unit 10 and the second decoupling network 30' corresponding to the antenna unit 20 in FIG. 3 may be taken as an example for a specific description in the following. It can be understood that the second decoupling network 30' may be the same with the first decoupling network 30.

The first decoupling network 30 may be a three-port network. In some embodiments, the three-port networks may include a first transmission line 31 and a second transmission line 32. An end of the first transmission line 31 is connected to an end of the second transmission line 32, and the first decoupling port may be formed at a connection between the first transmission line 31 and the second transmission line 32. The first input port connected to a first feed source 40 may be formed at the other end of the first transmission line 31, and the first output port connected to the antenna unit 10 may be formed at the other end of the second transmission line 32. An end of the decoupling transmission line 33 may be connected to the first decoupling port of the first decoupling network 30. It should be noted that "an end" and "the other end" of a certain transmission line described in the present disclosure are configured to indicate two opposite ends of the certain transmission line.

In the embodiments shown in FIG. 3, the second decoupling network 30' is the same as the first decoupling network 30 described above. The second decoupling network 30' may include a third transmission line 31' and a fourth transmission line 32'. An end of the third transmission line 31' is connected to an end of the fourth transmission line 32', and the second decoupling port may be formed at a connection between the third transmission line 31' and the fourth transmission line 32'. The second input port connected to a second feed source 40' may be formed at the other end of the third transmission line 31', and the second output port connected to the antenna unit 20 may be formed at the other end of the fourth transmission line 32'. An end of the decoupling transmission line 33' may be connected to the second decoupling port of the second decoupling network 30'. In some embodiments, the first feed source 40 and the second feed source 40' may be the same feed source.

The other end of the decoupling transmission line 33 may be connected to the second decoupling port of the second decoupling network 30', and the other end of the decoupling transmission line 33' may be connected to the first decoupling port of the first decoupling network 30. As shown in FIG. 3, the first decoupling network 30 and the second decoupling network 30' may share the same decoupling transmission line 33 (33'). The second decoupling port of the second decoupling network 30' may be connected to the first decoupling port of the first decoupling network 30 through the decoupling transmission line 33 (33').

The terms "first", "second", and "third" in the present disclosure are only used for a description purpose, and should not be construed as indicating or implying a relative importance or implying the number of indicated technical features. A feature defined with the term "first", "second", or "third" may expressly or implicitly include at least one the feature.

In some embodiments, a coupling degree between the first antenna unit 10 and the second antenna unit 20 may be determined based on a length of the decoupling transmission line, first scattering parameters of the first decoupling network 30, and second scattering parameters of the second decoupling network 30'. The first scattering parameters and the second scattering parameters may be S parameters. For example, when the coupling degree between the antenna unit 10 and the antenna unit 20 is required to reach a preset coupling degree D, then the S parameters of the three-port networks and the length of the decoupling transmission line 33 may be configured to allow the coupling degree between the antenna unit 10 and the antenna unit 20 to satisfy the preset coupling degree D.

It is easy to understand that, when the first decoupling network 30 and the second decoupling network 30' adopt the same structure, the S parameters of the first decoupling network 30 are the same as the S parameters of the second decoupling network 30'. In this way, in a case where the first decoupling network 30 are the same with the second decoupling network 30', a relationship among the coupling degree between the antenna unit 10 and the antenna unit 20, the S parameters of the three-port network (i.e., the first decoupling network 30 or the second decoupling network 30'), and the length of the decoupling transmission line may be obtained by in the following way.

A [S] matrix of decoupling networks may be the following formula (1).

$$[S] = \begin{bmatrix} S_{11} & S_{12} & S_{13} \\ S_{12} & S_{22} & S_{23} \\ S_{13} & S_{23} & S_{33} \end{bmatrix} \tag{1}$$

In some embodiments, $S_{11}$, $S_{22}$, $S_{33}$ may be reflection coefficients of three ports when the three-port network exists alone. $S_{12}$ may be a power fed directly from an input port to an output port. $S_{13}$ may be a power fed from the input port to a decoupling port. $S_{23}$ may be a power fed from the decoupling port to the output port.

Parameters $S_{11}$, $S_{22}$, $S_{33}$, and $S_{23}$ may be designed to be 0, such that the [S] matrix may be the following formula (2).

$$[S] = \begin{bmatrix} 0 & S_{12} & S_{13} \\ S_{12} & 0 & 0 \\ S_{13} & 0 & 0 \end{bmatrix} \tag{2}$$

At a reference surface II in FIG. 2, the decoupling ports of the three-port network may be connected to the decoupling transmission line having the length $d_5$, a formula of the S parameters of a six-port network including two three-ports networks may be the following formulas (3) and (4).

$$\begin{bmatrix} b_1 \\ b_2 \\ b'_1 \\ b'_2 \\ b_3 \\ b'_3 \end{bmatrix} = \begin{bmatrix} 0 & S_{12} & 0 & 0 & S_{13}e^{-jkd_5} & 0 \\ S_{12} & S_{22} & 0 & 0 & S_{23}e^{-jkd_5} & 0 \\ 0 & 0 & 0 & S_{12} & 0 & S_{13} \\ 0 & 0 & S_{12} & S_{22} & 0 & S_{23} \\ S_{13}e^{-jkd_5} & S_{23}e^{-jkd_5} & 0 & 0 & S_{23}e^{-jkd_5} & 0 \\ 0 & 0 & S_{13} & S_{23} & 0 & S_{33} \end{bmatrix} \begin{bmatrix} a_1 \\ a_2 \\ a'_1 \\ a'_2 \\ a_3 \\ a'_3 \end{bmatrix} \quad (3)$$

$$\begin{bmatrix} a_3 \\ a'_3 \end{bmatrix} = \begin{bmatrix} 0 & 1 \\ 1 & 0 \end{bmatrix} \begin{bmatrix} b_3 \\ b'_3 \end{bmatrix} = [\Gamma]_{2\times 2} \begin{bmatrix} b_3 \\ b'_3 \end{bmatrix} \quad (4)$$

In some embodiments, k is a wave number, e is a natural constant, and j is a symbol of an imaginary number.

The following formula (5) is obtained by changing a matrix in the formula (3) to a form of a block matrix.

$$\begin{bmatrix} [b_1]_{4\times 1} \\ [b_2]_{2\times 1} \end{bmatrix} = \begin{bmatrix} [S_{11}]_{4\times 4} & [S_{12}]_{4\times 2} \\ [S_{21}]_{2\times 4} & [S_{22}]_{2\times 2} \end{bmatrix} \begin{bmatrix} [a_1]_{4\times 1} \\ [a_2]_{2\times 1} \end{bmatrix} \quad (5)$$

The following formula (6) is obtained by changing the formula (5) to a form of an equation set.

$$\begin{cases} [b_1] = [S_{11}][a_1] + [S_{12}][a_2] \\ [b_2] = [S_{21}][a_1] + [S_{22}][a_2] \end{cases} \quad (6)$$

The formula (4) is abbreviated as the following formula (7).

$$[a_2]=[\Gamma]\cdot[b] \quad (7)$$

The following formula (8) is obtained by substituting the formula (7) into the formula (6).

$$\begin{cases} [b_1] = [S_{11}][a_1] + [S_{12}][\Gamma][b_2] & ① \\ [b_2] = [S_{21}][a_1] + [S_{22}][\Gamma][b_2] & ② \end{cases} \quad (8)$$

The following formula (9) is obtained based on a sub formula ② in the formula (8).

$$[b_1]=\{E-[S_{22}][\Gamma]\}^{-1}[S_{21}][a_1] \quad (9)$$

In an embodiment, E may indicate a unit matrix.

The following formula (10) is obtained by substituting the formula (9) into a formula ① in the formula (8).

$$[b_1]=[S_{11}][a_1]+[S_{12}][\Gamma]\{E-[S_{22}][\Gamma]\}^{-1}][S_{21}][a_1] \quad (10)$$

Based on the formula (10), a S parameter matrix of a four-port network (1, 2, 1', 2') formed by the two three-port networks being connected through the decoupling transmission line may be the following formula (11).

$$S_{Four\text{-}port}=[S_{11}]+[S_{12}][\Gamma]\{E-[S_{22}][\Gamma]\}^{-1}][S_{21}] \quad (11)$$

It should be noted that four ports of the four-port network may indicate four external ports as a whole formed after the two three-port networks being connected together. The four external ports may include a port ($a_1$, $b_1$), a port ($a_2$, $b_2$), a port ($a'_1$, $b'_1$) and a port ($a'_2$, $b'_2$).

A new S parameter matrix of the four-port network may be obtained by substituting a block matrix of the formula (3) and a block matrix of the formula (5) into the formula (11). The new S parameter matrix may be the following formula (12).

$$S_{Four-port} = \begin{bmatrix} 0 & S_{12} & 0 & 0 \\ S_{12} & 0 & 0 & 0 \\ 0 & 0 & 0 & S_{12} \\ 0 & 0 & S_{12} & 0 \end{bmatrix} + \begin{bmatrix} S_{13}e^{-jkd_5} & 0 \\ 0 & 0 \\ 0 & S_{13} \\ 0 & 0 \end{bmatrix} \times \begin{bmatrix} 0 & 1 \\ 1 & 0 \end{bmatrix} \times \left\{ \begin{bmatrix} 1 & 0 \\ 0 & 1 \end{bmatrix} - \begin{bmatrix} 0 & 0 \\ 0 & 0 \end{bmatrix} \begin{bmatrix} 0 & 1 \\ 1 & 0 \end{bmatrix} \right\}^{-1} \times \begin{bmatrix} S_{13}e^{-jkd_5} & 0 & 0 & 0 \\ 0 & 0 & S_{13} & 0 \end{bmatrix} = \begin{bmatrix} 0 & S_{12} & S_{13}^2e^{-jkd_5} & 0 \\ S_{12} & 0 & 0 & 0 \\ S_{13}^2e^{-jkd_5} & 0 & 0 & S_{12} \\ 0 & 0 & S_{12} & 0 \end{bmatrix} \quad (12)$$

Adjusting an order of the four ports of the four-port network to 1→1→2→2 the formula (12) may be changed to the following formula (13).

$$S_{Four-port} = \begin{bmatrix} 0 & S_{13}^2e^{-jkd_5} & S_{12} & 0 \\ S_{13}^2e^{-jkd_5} & 0 & 0 & S_{12} \\ S_{12} & 0 & 0 & 0 \\ 0 & S_{12} & 0 & 0 \end{bmatrix} \quad (13)$$

Changing the formula (13) to a form of the block matrix, the following formula (14) may be obtained.

$$S_{Four-port} = \begin{bmatrix} [S_{11}]_{2\times 2} & [S_{12}]_{2\times 2} \\ [S_{21}]_{2\times 2} & [S_{22}]_{2\times 2} \end{bmatrix} \quad (14)$$

The S parameter matrix of a binary antenna array formed by the two antenna units may be the following formula (15).

$$S_{array} = \begin{bmatrix} S'_{11} & S'_{12} \\ S'_{21} & S'_{22} \end{bmatrix} \quad (15)$$

In some embodiments, $S'_{12}$ is a strength of an initial isolation degree of the binary antenna array. That is, the initial isolation degree is an isolation degree when the first antenna unit 10 is not connected to the first decoupling network and the second antenna unit 20 is not connected to the second decoupling network. S'n is an input reflection coefficient, $S'_{21}$ is a forward transmission coefficient (the gain), and $S'_{22}$ is an output reflection coefficient, when the first antenna unit 10 is not connected to the first decoupling network and the second antenna unit 20 is not connected to the second decoupling network.

After the two three-port networks are connected together through the decoupling transmission line, the four-port network is formed. After the four-port network is connected to the antenna unit 10 and the antenna unit 20, a two-port network (1, 1') may be constructed. A S parameter matrix of the two-port network may be the following formula (16).

$$[S]=[S_{11}]+[S_{12}][S_{array}]\{E-[S_{22}][S_{array}]\}^{-1}[S_{21}] \quad (16)$$

It should be noted that two ports of the two-port network may indicate two ports remained after the two three-port networks are connected together and subsequently the antenna unit 10 and the antenna unit 20 are connected. The two ports are configured to be connected to the feed sources and include the port ($a_1$, $b_1$) and the port ($a'_1$, $b'_1$).

Substituting the block matrix defined by the formula (13) and the formula (14) into the formula (16), the following formula (17) may be obtained.

$$[S]=\begin{bmatrix} 0 & S'_{12}S_{12}^2+S_{13}^2e^{-jkd_5} \\ S'_{12}S_{12}^2+S_{13}^2e^{-jkd_5} & 0 \end{bmatrix} \tag{17}$$

Based on the formula (17), it may be known that $S'_{12}S_{12}^2+S_{13}^2e^{-jkd_{s=\text{the coupling degree.}}}$ In some embodiments, $S'_{12}$ is the strength of the initial isolation degree. That is, $S'_{12}$ is a strength of an isolation degree when the first antenna unit 10 is not connected to the first decoupling network 30 and the second antenna unit 20 is not connected to the second decoupling network 30'.

In this way, the coupling degree between the antennas may be precisely defined by designing the length $d_5$ of the decoupling transmission line 33 and the S parameters of the three-port networks. That is, when a required coupling degree is preset, the above formula may be expressed as $S'_{12}S_{12}^2+S_{13}^2e^{-jkd_{s=\text{the preset coupling degree.}}}$ Therefore, the length $d_5$ of the decoupling transmission line 33 and the S parameters of the three-port networks may be configured to allow the coupling degree between the antenna unit 10 and the antenna unit 20 to satisfy the preset coupling degree.

In some embodiments, the first decoupling network 30 and the decoupling transmission line 33 may form the first power divider. The second decoupling network 30' and the decoupling transmission line 33 may form the second power divider. In this case, the length of the decoupling transmission line 33 and power division ratios of power dividers may be configured to make the coupling degree between the antenna unit 10 and the antenna unit 20 be 0.

The length of the decoupling transmission line 33 and the power division ratios of the power dividers may be determined by the initial isolation degree between the antenna unit 10 and the antenna unit 20. The initial isolation degree may be the isolation degree when the first antenna unit 10 is not connected to the first decoupling network 30 and the second antenna unit 20 is not connected to the second decoupling network 30'. That is, in some embodiments, between the antenna unit 10 and the antenna unit 20, the length of the decoupling transmission line 33 and the power division ratios may be configured based on the initial isolation degree, so as to make the coupling degree between the antenna unit 10 and the antenna unit 20 to be 0.

The power division ratios of the power dividers may be determined based on the strength (i.e., $S'_{12}$) of the initial isolation degree between the antenna unit 10 and the antenna unit 20. The length of the decoupling transmission line 33 may be determined based on a phase ($\phi'_{12}$) of the initial isolation degree between the antenna unit 10 and the antenna unit 20.

For example, in response to the decoupling network being required to completely offset the mutual coupling between the antenna unit 10 and the antenna unit 20, when the preset coupling degree is set to be 0, then the following formula (18) may be obtained.

$$S'_{12}S_{12}^2+S_{13}^2e^{jkd_5}=0 \tag{18}$$

Based on the formula (18), the following formula (19) may be obtained.

$$S'_{12}=-\frac{S_{13}^2}{S_{12}^2}e^{-jkd_5} \tag{19}$$

In some embodiments, $$\frac{S_{13}^2}{S_{12}^2}$$

is the power division ratio of the power divider. Therefore, S parameters of the decoupling networks may be determined based on the power division ratio.

Based on the formula (19), when $S_{12}=|S|_{12}|e^{j\phi_{12}}$, $S_{13}=|S_{13}|e^{j\phi_{13}}$, $S'_{12}=|S'_{12}|e^{j\phi'_{12}}$, and $\phi_{12}=\phi_{13}$, then the following formulas (20) and (21) may be obtained.

$$|S'_{12}|e^{j\phi'_{12}}=\frac{|S_{13}^2|}{|S_{12}^2|}e^{j(\pi-kd_5)} \tag{20}$$

$$\begin{cases} |S'_{12}|=|S_{13}^2|/|S_{12}^2| \\ \phi'_{12}=\pi-kd_5 \end{cases} \tag{21}$$

Based on the above description, the power division ratio of the power divider is configured to cooperate with the strength of the initial isolation degree between the first antenna unit 10 and the second antenna unit 20 to satisfy a relationship indicated in the formula (21), and the length of the decoupling transmission line 33 is configured to cooperate with the phase of the initial isolation degree between the first antenna unit 10 and the second antenna unit 20 to satisfy a relationship indicated in the formula (21), the coupling degree between the first antenna unit 10 and the second antenna unit 20 being 0 may be achieved.

The strength $S'_{12}$ and the phase $\phi'_{12}$ of the initial isolation degree are already known, a relationship between the wave number k and a wavelength $\lambda$ is also known Therefore, a wave number k represented by the wavelength $\lambda$ is substituted into the formula (21), and the following formula (22) for calculating $d_5$ may be obtained.

$$d_3=\left(m+\frac{1}{2}\right)\cdot\lambda-\frac{\phi'_{12}}{2\times pi}\lambda,\ m=0,1,2,\ldots \tag{22}$$

In this way, after the power division ratio of the power divider and the length $d_5$ of the decoupling transmission line 33, a power divider having the power division ratio and a decoupling transmission line 33 having the length $d_5$ may be designed, such that the coupling degree being 0 may be achieved.

In some embodiments, the power division ratio of the power divider may have a relationship with a characteristic impedance of the first transmission line 31, a characteristic impedance of the second transmission line 32, and a characteristic impedance of the decoupling transmission line 33. It can be seen from the above embodiments that the power division ratio of the power divider may be obtained based on the strength of the initial isolation degree. Therefore, the characteristic impedance of the second transmission line 32 and the characteristic impedance of the decoupling transmission line 33 may be determined based on an obtained power division ratio and the characteristic impedance of the first transmission line 31. Therefore, the characteristic impedance of the second transmission line 32 and the characteristic impedance of the decoupling transmission line 33 may be determined based on the characteristic impedance of the first transmission line 31 and the strength of the initial isolation degree.

Taking the power divider being a T-junction power divider as an example, as shown in FIG. 3, a relationship among the characteristic impedance $Z_2$ of the second transmission line 32, the characteristic impedance $Z_1$ of the first transmission line 31, and the power division ratio (a function about the strength $S'_{12}$ of the initial isolation degree) may satisfy the following formula (23).

$$Z_2=(1+|S'_{12}|)\times Z_1 \tag{23}$$

A relationship among the characteristic impedance $Z_3$ of the decoupling transmission line 33, the characteristic impedance Z of the first transmission line 31, and the power division ratio (the strength $S'_{12}$ of the initial isolation degree) may satisfy the following formula (24).

$$Z_3=\left(1+\frac{1}{|S'_{12}|}\right)\times Z_1 \tag{24}$$

Therefore, based on the above embodiments, a required power division ratio of the power divider may be obtained through the preset coupling degree. A required characteristic impedance $Z_2$ of the second transmission line 32 and a required characteristic impedance $Z_3$ of the decoupling transmission line 33 may be obtained based on the power division ratio. In this way, the second transmission line 32 and the decoupling transmission line 33 of the decoupling network may be configured, such that the characteristic impedance of the second transmission line 32 may meet the required characteristic impedance $Z_2$, and the characteristic impedance of the decoupling transmission line 33 may meet the required characteristic impedance $Z_3$.

In some embodiments, the characteristic impedance of the transmission line may meet a requirement by configuring a line width of the transmission line, that is, a line width of the second transmission line 32 may be determined based on the characteristic impedance of the second transmission line 32. A line width of the decoupling transmission line 33 may be determined based on the characteristic impedance of the decoupling transmission line 33. For example, after obtaining the characteristic impedance $Z_2$ of the second transmission line 32 based on the above formula, the line width of the second transmission line 32 may be configured such that the characteristic impedance of the second transmission line 32 may satisfy the above characteristic impedance $Z_2$. For example, after determining factors, such as a required thickness of the second transmission line 32, a relative permittivity of a PCB board, a thickness of the dielectric layer, or the like, the line width of the second transmission line 32 may be calculated based on the required characteristic impedance $Z_2$ and the relationship between the characteristic impedance and the line width. Therefore, the line width of the second transmission line 32 may be configured based on a calculation result, such that the second transmission line 32 having the above characteristic impedance $Z_2$ may be obtained.

Similarly, the decoupling transmission line 33 may satisfy the required characteristic impedance $Z_3$ by configuring the line width of the decoupling transmission line 33. The line width of the decoupling transmission line 33 may be calculated based on the required characteristic impedance $Z_3$ and the relationship between the characteristic impedance and the line width. Therefore, the line width of the decoupling transmission line 33 may be configured based on a calculation result, such that the decoupling transmission line 33 having the above characteristic impedance $Z_3$ may be obtained.

It can be understood that the power divider may also be of other types, e.g., a Wilkinson power divider. In this case, the characteristic impedance $Z_2$ of the second transmission line and the characteristic impedance $Z_3$ of the decoupling transmission line may be calculated based on a relational formula corresponding to the Wilkinson power divider.

In some embodiments, the input impedances of feed ports of the antenna unit 10 and the antenna unit 20 may be 50Ω matched. The second transmission line 32 may be configured to include 3 sections, and each of the 3 sections has a ¼λ length. In this way, the impedance of the second transmission line 32 may be matched to 50Ω.

Figure 4:
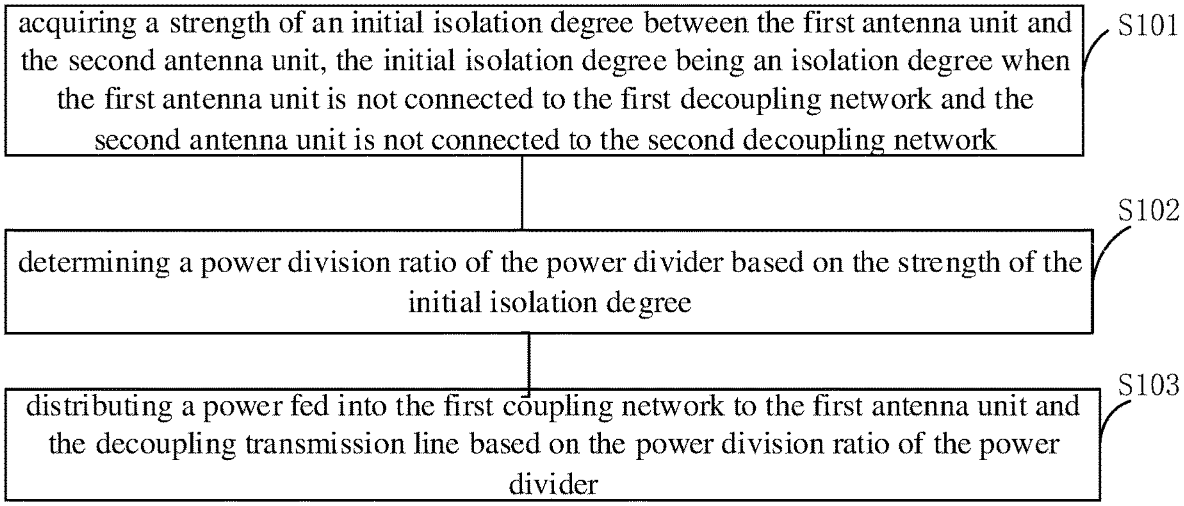
FIG. 4 is a schematic flowchart of a decoupling method for the array antenna according to some embodiments of the present disclosure.

In combination with the above decoupling structure, a decoupling method for the antenna apparatus is provided in the present disclosure. The antenna apparatus may be the antenna apparatus in any of the above embodiments. FIG. 4 is a schematic flowchart of a decoupling method for the antenna apparatus according to some embodiments of the present disclosure.

As shown in FIG. 4, the decoupling method may include the following operations S101-S105.

In an operation S101, the method may include acquiring a strength of an initial isolation degree between the first antenna unit and the second antenna unit, the initial isolation degree being an isolation degree when the first antenna unit is not connected to the first decoupling network and the second antenna unit is not connected to the second decoupling network.

In an operation S102, the method may include determining a power division ratio of the power divider based on the strength of the initial isolation degree.

In an operation S103, the method may include distributing a power fed into the first coupling network to the first antenna unit and the decoupling transmission line based on the power division ratio of the power divider.

In some embodiments, the decoupling method may further include obtaining a phase of the initial isolation degree; and determining a length of the decoupling transmission line based on the phase of the initial isolation degree.

In some embodiments, the coupling degree between the first antenna unit and the second antenna unit may be determined based on the length of the decoupling transmission line and first scattering parameters of a first three-port network and second scattering parameters of a second three-port network.

In some embodiments, the coupling degree between the first antenna unit and the second antenna unit may be determined based on the following formula: $S'_{12}S_{12}^2+S_{13}^2e^{jkd_2}$=the coupling degree. $S'_{12}$ is the strength of the initial isolation degree between the first antenna unit and the second antenna unit, and the initial isolation degree is an isolation degree when the first antenna unit is not connected to the first three-port network and the second antenna unit is not connected to the second three-port network. $S_{12}$ and $S_{13}$ are the first scattering parameters of the first three-port network. $d_5$ is the length of the decoupling transmission line, k is a wave number, e is a natural constant, and j is a symbol of an imaginary number.

In some embodiments, the length of the decoupling transmission line may be set based on the phase of the initial isolation degree between the first antenna unit and the second antenna unit.

In some embodiments, the power division ratio of the power divider and the length of the decoupling transmission line may be determined based on the aforementioned relationship (21). In some embodiments, a characteristic impedance of the second transmission line and a characteristic impedance of the decoupling transmission line may be determined based on a characteristic impedance of the first transmission line and the strength of the initial isolation degree.

In some embodiments, the characteristic impedance of the second transmission line may be determined based on the aforementioned relationship (23).

In some embodiments, the characteristic impedance of the decoupled transmission line may be determined based on the aforementioned relationship (24).

In some embodiments, a line width of the second transmission line and a line width of the decoupling transmission line may be calculated based on the characteristic impedance of the second transmission line and the characteristic impedance of the decoupling transmission line.

In some embodiments, the length of the decoupling transmission line may be determined based on the aforementioned relationship (22).

It is easy to understand that relevant contents of the decoupling principle described above in the present disclosure may be applied to the decoupling method, and details are not repeated herein.

Figure 5:
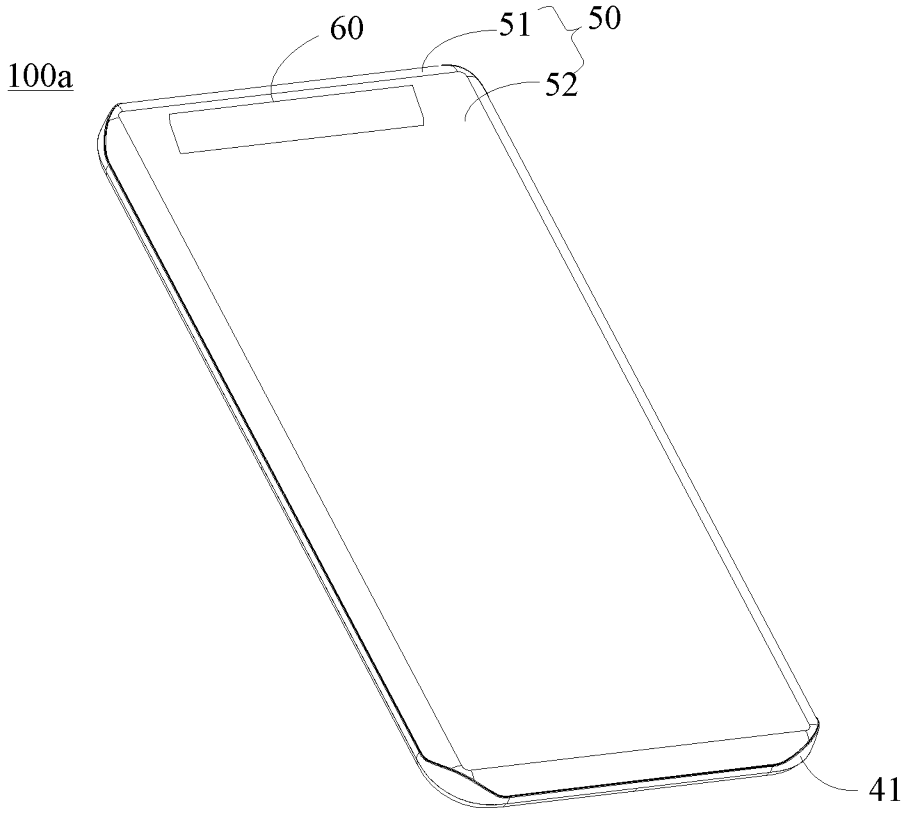
FIG. 5 is a structural schematic diagram of another electronic device according to some embodiments of the present disclosure.

In some embodiments, the electronic device of the present disclosure may be a mobile phone 100*a* as shown in FIG. 5. The electronic device may include but be not limited to the following structure. The electronic device may include a housing 41, a display screen assembly 50 connected to the housing 41. An accommodating space may be defined by the housing 41 and the display screen assembly 50. Other electronic components of the mobile phone, such as a motherboard, a battery, an RF chip 64, and an antenna apparatus 60 may be arranged inside the accommodating space.

The housing 41 may be made of a plastic, a glass, a ceramic, a fiber composite material, a metal (e.g., a stainless steel, an aluminum, etc.), or other suitable materials. The housing 41 as shown in FIG. 5 may be substantially rectangular with rounded corners. Of course, the housing 41 may also have other shapes, such as a circular, an oblong, oval, or the like.

The display screen assembly 50 may include a display screen cover 51 and a display module 52. The display module 52 may be attached to an inner surface of the display screen cover 51. The housing 41 may be connected to the display screen cover 51 of the display screen assembly 50. The display screen cover 51 may be made of a glass material. The display module 52 may be an OLED flexible display screen structure, and include a substrate, a display panel, an auxiliary material layer, etc. In addition, structures such as a polarizing diaphragm, or the like, may also be sandwiched between the display module 52 and the display screen cover 51. A detailed stacked structure of the display module 52 is not limited herein.

The antenna apparatus 60 may be completely accommodated in the housing 41, or may also be embedded in the housing 41, and a part of the antenna apparatus 60 may be exposed on an outer surface of the housing 41.

In some embodiments, the antenna apparatus 60 may include multiple antenna units arranged at intervals, multiple decoupling networks, and multiple decoupling transmission lines. The multiple decoupling networks may correspond to the multiple antenna units one to one. Each of the decoupling transmission lines may be connected between adjacent decoupling networks. The decoupling networks may be the decoupling network in any of the above embodiments.

Figure 6:
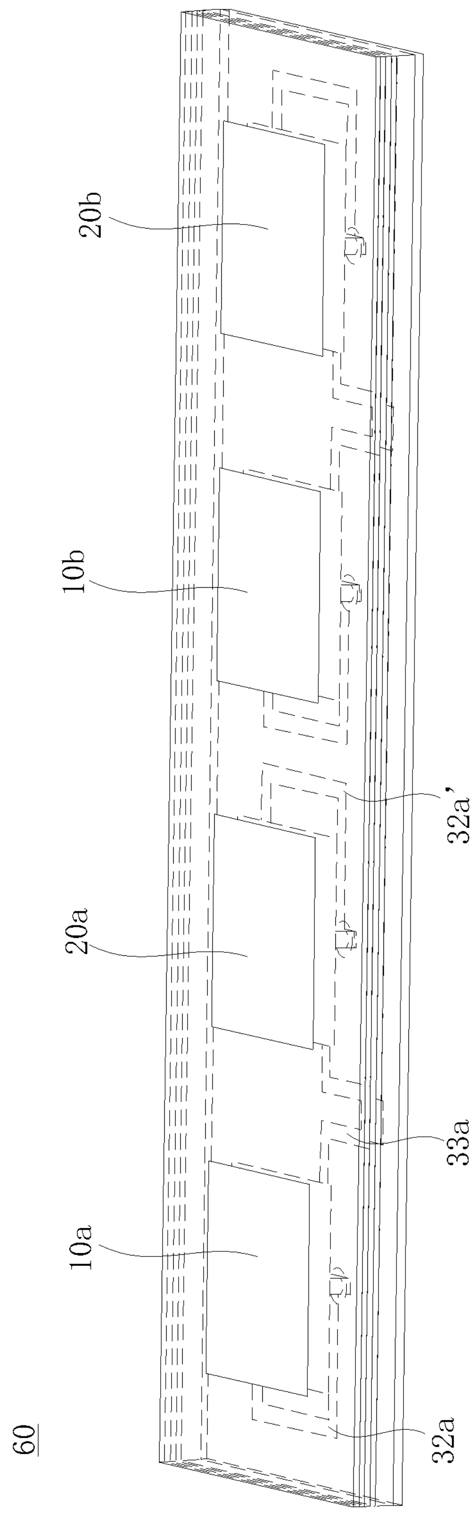
FIG. 6 is a perspective view of an antenna apparatus according to some embodiments of the present disclosure.
Figure 7:
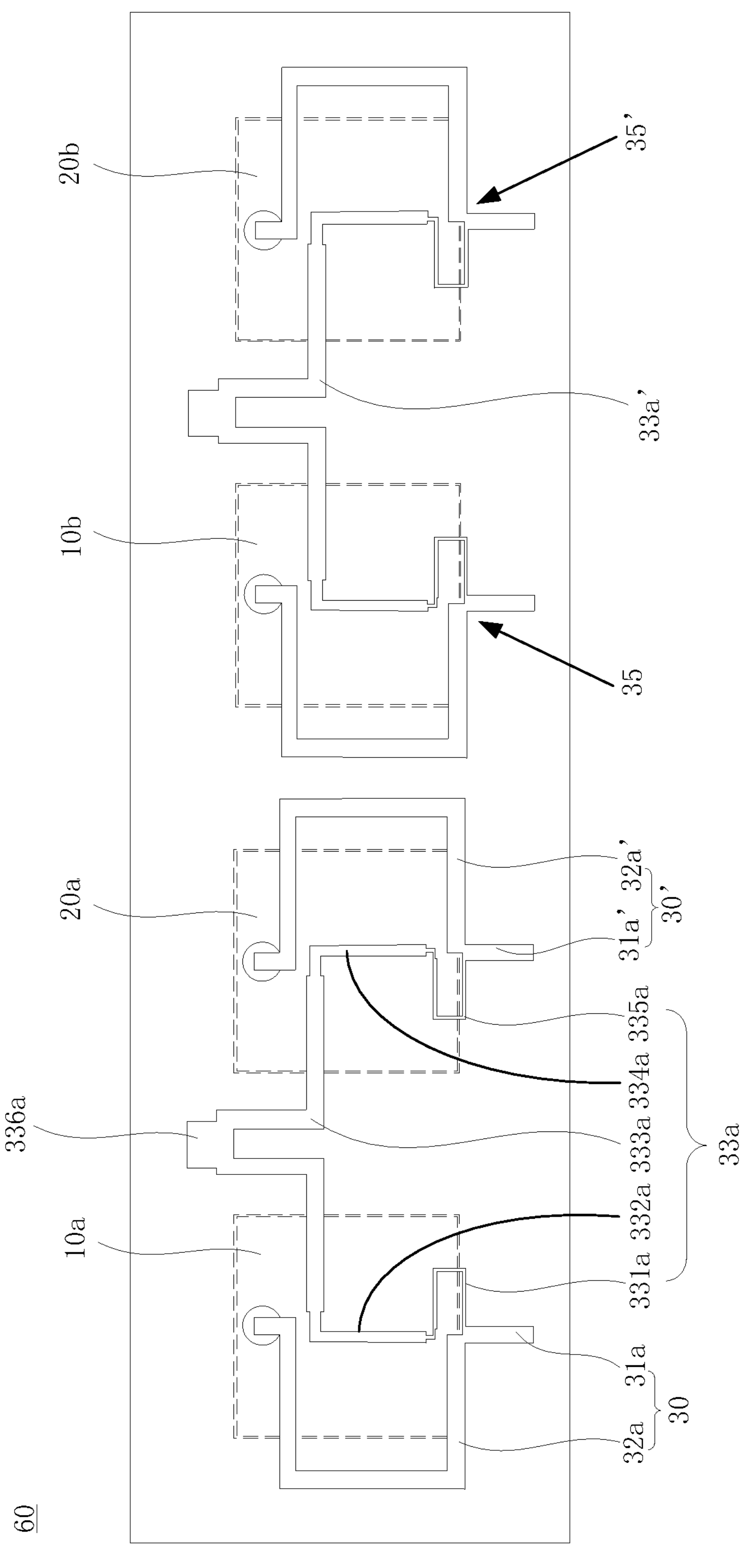
FIG. 7 is a bottom view of the antenna apparatus in FIG. 6.

In some embodiments, the multiple antenna units of the antenna apparatus 60 may be a quadruple linear array as shown in FIG. 6 and FIG. 7. That is, the quadruple linear array may have four antenna units arranged in a line. The four antenna units may include an antenna unit 10*a*, an antenna unit 20*a*, an antenna unit 10*b*, and an antenna unit 20*b*.

Figure 8:
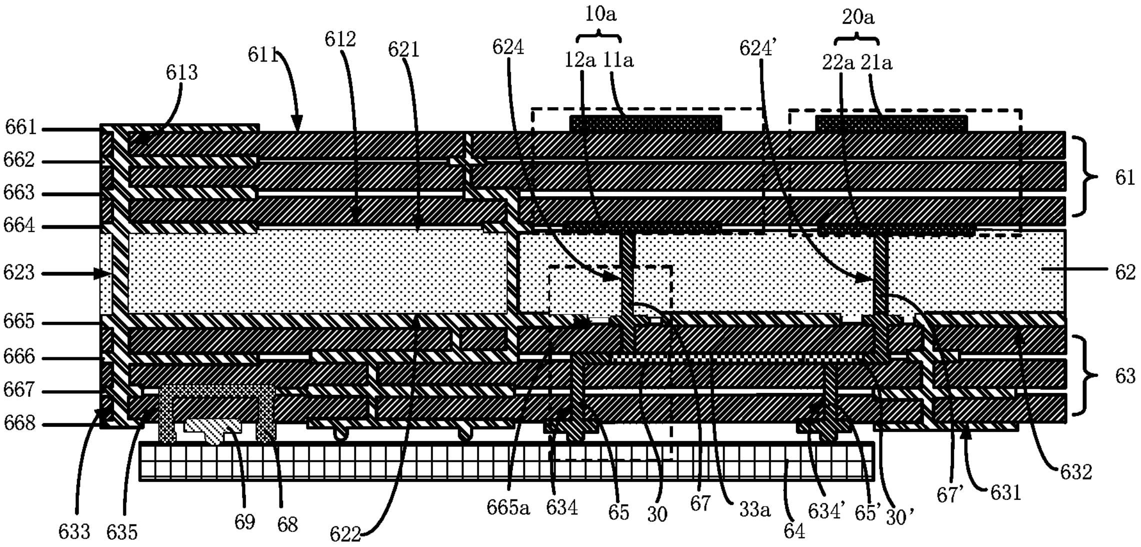
FIG. 8 is a schematic view of a layered structure of two antenna units of the antenna apparatus according to some embodiments of the present disclosure.

As shown in FIG. 8, the antenna apparatus 60 may include a first substrate 61, a second substrate 62, and a third substrate 63 stacked in sequence, multiple antenna units (FIG. 8 only shows two antenna units, i.e., the antenna unit 10*a* and the antenna unit 20*a*), multiple metal layers 661-668 (a metal layer 665 being a ground layer) formed on the first substrate 61 and the third substrate 63, multiple feeder lines penetrated in the third substrate 63 and the second substrate 62, multiple decoupling networks (e.g., the first decoupling network 30 and the second decoupling network 30') arranged in the third substrate 63, and multiple decoupling transmission line 33*a* connected between the decoupling networks. In some embodiments, the multiple feeder lines, the multiple decoupling networks, and the multiple antenna units are in a one-to-one correspondence. The present embodiment is described with the antenna unit 10*a*, the first decoupling network 30, and a corresponding feeder line. The feeder line may be configured to be connected to a corresponding antenna unit 10 a, a corresponding decoupling network 30, and a corresponding RF chip 64. The decoupling transmission line 33*a* is configured to be connect between the first decoupling network 30 corresponding to the antenna units 10*a* and the second decoupling network 30' corresponding to the antenna unit 20*a* adjacent to the antenna units 10*a*, such that a coupling between the antenna unit 10*a* and the antenna unit 20*a* may be offset. Understandably, the antenna apparatus 60 may also include other signal transmission lines.

The antenna unit 10*a* and the antenna unit 20*a* may be configured to transmit and receive the RF signal. As shown in FIG. 8, the antenna unit 10*a* and the antenna unit 20*a* are arranged at intervals. The antenna unit 10*a* and the antenna unit 20*a* are double-layer patch antennas, and may include a first surface radiating sheet 11*a*, a second surface radiating sheet 21*a*, a first inner radiating sheet 12*a*, and a second inner radiating sheet 22*a* isolated from each other. The first surface radiating sheet 11*a* corresponds to the first inner radiating sheet 12*a*, and the second surface radiating sheet 21*a* corresponds to the second inner radiating sheet 22*a*. That is, the antenna unit 10*a* includes the first surface radiating sheet 11*a* and the first inner radiating sheet 12*a* corresponding to and isolated from the first surface radiating sheet 11*a*, and the antenna unit 20*a* includes the second surface radiating sheet 21*a* and the second inner radiating sheet 22*a* corresponding to and isolated from the second surface radiating sheet 21*a*. The first surface radiating sheet 11*a* and the second surface radiating sheet 21*a* are arranged on a surface of the first substrate away from the second substrate, and the first inner radiating sheet 12*a* and the second inner radiating sheet 22*a* are arranged on a surface of the first substrate close to the second substrate.

The first substrate 61 may include a first outer surface 611 and a first inner surface 612 opposite to the first outer surface 611. The first surface radiating sheet 11*a* and the second surface radiating sheet 21*a* are arranged on the first outer surface 611, and the inner radiating sheet 12*a* and the second inner radiating sheet 22*a* are arranged on the first inner surface 612. The inner radiating sheet 12*a* and the second inner radiating sheet 22*a* are isolated from the first surface radiating sheet 11*a* and the second surface radiating sheet 21*a* by the first substrate 61, such that the first surface radiating sheet 11*a* and the second surface radiating sheet

21*a* may be spaced from the inner radiating sheet 12*a* and the second inner radiating sheet 22*a* with a certain distance, so as to meet performance requirements of frequency bands of the antenna. Vertical projections of the first surface radiating sheet 11*a* and the second surface radiating sheet 21*a* may at least partially overlap with vertical projections of the inner radiating sheet 12*a* and the second inner radiating sheet 22*a*.

The first substrate 61 may be made of a thermosetting resin such as an epoxy resin, a thermoplastic resin such as a polyimide resin, a reinforcing material including glass fibers (or glass cloth, or glass fabrics) and/or inorganic fillers, and a resin insulating material (e.g., a prepreg, an Ajinomoto Build-up Film (ABF), a photosensitive dielectric (PID), etc.) of the thermosetting resin and the thermoplastic resin. However, a material of the first substrate 61 is not limited thereto. That is, a glass plate or a ceramic plate may also be used as the material of the first substrate 61. Alternatively, a liquid crystal polymer (LCP) having a low dielectric loss may also be used as the material of the first substrate 61 to reduce a signal loss.

In some embodiments, the first substrate 61 may be the prepreg. As shown in FIG. 8, the first substrate 61 may include three layers of prepregs stacked together. The three layers of prepregs may include a first prepreg layer, a second prepreg layer, and a third prepreg layer in sequence along a direction towards to the second substrate 62. In the three layers of prepregs of the first substrate 61, a first metal layer 662 is arranged between the first prepreg layer and the second prepreg layer, and a second metal layer 663 is arranged between the second prepreg layer and the third prepreg layer. A third metal layer 661 is further arranged on the first outer surface. The third metal layer 661 is located in the same layer with the first surface radiating sheet 11*a* and the second surface radiating sheet 21*a*, and insulated from the first surface radiating sheet 11*a* and the second surface radiating sheet 21*a*. A fourth metal layer 664 is arranged on the first inner surface 612 of the first substrate 61. The fourth metal layer 664 is arranged on the same layer with the inner radiating sheet 12*a* and the second inner radiating sheet 22*a*, and insulated from the inner radiating sheet 12*a* and the second inner radiating sheet 22*a*. The first metal layer 661, the second metal layer 662, the third metal layer 663, and the fourth metal layer 664 may be made of conductive materials such as a metal copper, aluminum, silver, tin, gold, nickel, lead, titanium or their alloys. In the present embodiment, the first metal layer 661, the second metal layer 662, the third metal layer 663, and the fourth metal layer 664 may all be made of the copper.

The first metal layer 661 is configured to reduce a difference between a copper spreading rate of the first outer surface 611 of the first substrate 61 and copper spreading rates of surfaces of other prepregs of the first substrate 61. During a manufacturing process of the first substrate 61, when the difference in the copper spreading rate is reduced, a generation of an air bubble may be reduced, such that a field of manufacturing the first substrate 61 may be improved. Similarly, the fourth metal layer 664 may also be configured to reduce the difference between a copper spreading rate of the first inner surface 612 of the first substrate 61 and the copper spreading rates of the surfaces of other prepregs of the first substrate 61, so as to reduce the generation of the air bubble in the process of manufacturing the first substrate 61. In this way, the yield of manufacturing the first substrate 61 may be improved.

A first ground-connected via 613 may be further defined in the first substrate 61. The first ground-connected via 613 may penetrate the first inner surface 612 and the first outer surface 611, such that different metal layers, e.g., the first metal layer 661, the second metal layer 662, the third metal layer 663, and the fourth metal layer 664 may be connected to each other and further connected to the ground layer 665. The first ground-connected via 613 may be completely filled with the conductive material, or a first conductive layer may be formed along a wall of the first ground-connected via 613 with the conductive material. In some embodiments, the conductive material may be the copper, the aluminum, the silver, the tin, the gold, the nickel, the lead, the titanium or their alloys. The first ground-connected via 613 may be substantially in a cylindrical shape, an hourglass shape, a pyramid shape, or the like.

The second substrate 62 may include a first side surface 621 and a second side surface 622. The first side surface 621 may be stacked on the first inner surface 612 of the first substrate 61. The second substrate 62 may be a core layer of the PCB board, and made of a material such as polyimide, polyethylene terephthalate, polyethylene naphthalate, or the like. A second ground-connected via 623 and a feeder via 624 may be defined in the second substrate 62. The second ground-connected via 623 and the feeder via 624 may penetrate through the first side surface 621 and the second side surface 622.

The ground layer 665 may be sandwiched between the second substrate 62 and the third substrate 63. A feeder via 665*a* may be defined in the ground layer 665.

The third substrate 63 may include a second outer surface 631 and a second inner surface 632 opposite to the second outer surface 631. The second inner surface 632 of the third substrate 63 may be stacked on the second side surface 622 of the second substrate 62, and the second ground layer 665 may be sandwiched between the second side surface 622 and the second inner surface 632.

A material of the third substrate 63 may be the same with the material of the first substrate 61. In some embodiments, the third substrate 63 may be a prepreg having a multi-layer structure. As shown in FIG. 8, the third substrate 63 may include three layers of prepregs. The three layers of prepregs may include a fourth prepreg layer, a fifth prepreg layer, and a sixth prepreg layer in sequence along a direction away from the second substrate 62. In the three layers of prepregs of the second substrate 62, a fifth metal layer 666 is arranged between the fourth prepreg layer and the fifth prepreg layer, and a sixth metal layer 667 is arranged between the fifth prepreg layer and the sixth prepreg layer. The fifth metal layer 666 is configured as a wiring layer for a feed network and the sixth metal layer 667 is configured as a wiring layer for a controlling line. A seventh metal layer 668 may be arranged on the second outer surface 631 of the third substrate 63, and the seventh metal layer 668 is welded to the RF chip 64. The fifth metal layer 666, the sixth metal layer 667, and the seventh metal layer 668 may be made of the conductive material such as the metal copper, the aluminum, the silver, the tin, the gold, the nickel, the lead, the titanium or their alloys. In the present embodiment, the fifth metal layer 666, the sixth metal layer 667, and the seventh metal layer 668 may all be made of the copper.

Wiring vias may be defined in the third substrate 63. The wiring vias may include a third ground-connected via 633, such that different metal layers, i.e., the fifth metal layer 666, the sixth metal layer 667, and the seventh metal layer 668 may be connected to each other and further be connected to ground layer 665. The wiring vias may also include a feeder via 634, a signal via 635, or the like. The feeder via 634 is configured for a feeder to pass through, and the signal via 635 is configured for a control line to pass through. Similar to the first ground-connected via 613 in the first substrate 61, the wiring vias in the third substrate 63 may be completely filled with the conductive material, or second conductive layers may be formed on walls of the wiring vias. Shapes of various wiring via may be substantially in the cylindrical shape, the hourglass shape, or the pyramidal shape.

The RF ship 64 may be arranged on a side of the third substrate 63 away from the first substrate 61, and is equivalent to the feed source in the foregoing embodiments, such as the first feed source 40 and the second feed source 40'. In a case of multiple feed sources, the multiple feed sources may be the same or different.

Feeders may include a first feeder 65, a second feeder 67, a third feeder 65', and a fourth feeder 67'. The first decoupling network 30 may be connected between the first feeder 65 and the second feeder 67. The second decoupling network 30' may be connected between the third feeder 65' and the fourth feeder 67'. An end of the first feeder 65 and an end of the third feeder 65' may be arranged on a side of the third substrate 63 away from the second substrate 62 to be connected to the RF ship 64, and the other end of first feeder 65 and the other end of the third feeder 65' may extend into the third substrate 63. The feeder via 634 includes a first feeder via 634 and a second feeder via 634'. That is, the other end of first feeder 65 may penetrate through the first feeder via 634 of the third substrate 63 to be connected to the first decoupling network 30; the other end of third feeder 65' may penetrate through the second feeder via 634' of the third substrate 63 to be connected to the second decoupling network 30'. A part of the second feeder 67 may be arranged in the third substrate 67 to be connected to the first decoupling network 30, and the other part of the second feeder 67 may penetrate through the second substrate 62. A part of the fourth feeder 67' may be arranged in the third substrate 67 to be connected to the second decoupling network 30', and the other part of the fourth feeder 67' may penetrate through the second substrate 62. The feeder via 624 includes a third feeder via 624 and a fourth feeder via 624'. That is, the other part of the second feeder 67 may penetrate through the third feeder via 624 of the second substrate 62 to be connected to the antenna unit 10*a* corresponding to the first decoupling network 30. That is, the other part of the fourth feeder 67' may penetrate through the fourth feeder via 624' of the second substrate 62 to be connected to the antenna unit 20*a* corresponding to the second decoupling network 30'.

Therefore, the RF ship 64, the first feeder 65, the decoupling network 30, the second feeder 67, and the antenna unit 10 are connected in sequence to realize the signal transmission between the antenna unit 10 and the RF chip 64. The feeders and each of the metal layers such as the fifth metal layer 666, the sixth metal layer 667, and the seventh metal layer 668 in the present embodiment, and the ground layer 665 are insulated from each other.

In addition, other signal transmission lines such as a control line 68 and a power line 69 may also be arranged on the third substrate 63. As shown in FIG. 8, the power line 69 may be arranged on the second outer surface 631 of the third substrate 63 and welded on the RF ship 64. The control line 68 may be arranged between the sixth prepreg layer and the fifth prepreg layer of the third substrate 63. The sixth prepreg layer is a prepreg layer close to the RF ship 64, and the fifth prepreg layer is adjacent to the sixth prepreg layer. The control line 68 may penetrate through the signal via 635 in the sixth prepreg to be connected to the RF ship 64.

In addition, the third substrate 63 may also be configured to carry the multiple decoupling networks and the multiple decoupling transmission lines 33*a*. The decoupling networks may be the decoupling networks in any of the foregoing embodiments. As shown in FIG. 7 and FIG. 8, the first decoupling network 30 and the second decoupling network 30' are taken as an example. The first decoupling network 30 may include a first transmission line 31*a* and a second transmission line 32*a*. An end of the first transmission line 31*a* may be configured to be connected to the RF chip 64. The other end of the first transmission line 31*a* may be connected to an end of the second transmission line 32*a*, and the first decoupling port may be formed at a connection between the first transmission line 31 and the second transmission line 32. The other end of the second transmission line 32*a* may be connected to the antenna unit 10*a* corresponding to the first decoupling network 30. The first transmission line 31*a* may be connected to the RF ship 64 through the first feeder 65. The second transmission line 32*a* may be connected to the antenna unit 10*a* through the second feeder 67. The second decoupling network 30' may include a third transmission line 31*a'* and a fourth transmission line 32*a'*. An end of the third transmission line 31*a'* may be configured to be connected to the RF ship 64, and the other end of the third transmission line 31*a'* may be configured to be connected to an end of the fourth transmission line 32*a'*. A second decoupling port may be formed at a connection between the third transmission line 31*a'* and the fourth transmission line 32*a'*. The other end of the fourth transmission line 32*a'* may be connected to the antenna unit 20*a* corresponding to the second decoupling network 30'. The third transmission line 31*a'* may be connected to the RF ship 64 through the third feeder 65', and the fourth transmission line 32*a'* may be connected to the antenna unit 20*a* through the fourth feeder 67'.

The decoupling transmission line 33*a* is connected between the first decoupling network 30 and the second decoupling network 30'. An end of the decoupling transmission line 33*a* is connected to a connection between the second transmission line 32*a* and the first transmission line 31*a* corresponding to the antenna unit 10*a*, and the other end of the decoupling transmission line 33*a* is connected to a connection between the fourth transmission line 32*a'* and the first transmission line 31*a* corresponding to the antenna unit 20*a* adjacent to the antenna unit 10*a*.

The first transmission line 31*a*, the second transmission line 32*a*, and the decoupling transmission line 33*a* may form a power divider. For example, after the signal sent from the RF ship 64 is input to the first transmission line 31*a* through the first feeder 65, a part of the signal may be transmitted to the first inner radiating sheet 12*a* of the antenna unit 10*a* through the second transmission line 32*a* and the second feeder 67, and the other part of the signal may be transmitted to the antenna unit 20*a* adjacent to the antenna unit 10*a* through the decoupling transmission line 33*a*. in this way, the coupling between the antenna unit 10*a* and the antenna unit 20*a* may be offset.

The coupling degree between the antenna unit 10*a* and the antenna unit 20*a* may be defined by the scattering parameters of the decoupling networks and the length of the decoupling transmission line 33*a*. As in the above embodiments of the array antenna, a relationship among the length $d_5$ of the decoupling transmission line 33*a* of the decoupling networks of the antenna apparatus 60 in the present embodiment, the S parameters of the decoupling networks, and the preset coupling degree may satisfy the following formula: $S'_{12}S_{12}^2+S_{13}^2e^{-jkd_5}$=the preset coupling degree.

In some embodiments, the length of the decoupling transmission line 33*a* in the decoupling networks and the power division ratio of the power divider may be configured to make the coupling degree between the antenna unit 10*a* and the antenna unit 20*a* be 0.

In some embodiments, the length of the decoupling transmission line 33*a* and the power division ratio of the power divider may be configured based on the initial isolation degree between the antenna unit 10*a* and the antenna unit 20*a*. The power division ratio of the power divider may be configured based on the strength of the initial isolation degree, and the length of the decoupling transmission line 33*a* may be configured based on the phase of the initial isolation degree. For example, the relationship between the power division ratio of the power divider and the strength of the initial isolation, and the relationship between the length of the decoupling transmission line 33*a* and the phase of the initial isolation degree may satisfy the aforementioned relational formulas (21) and (22).

In some embodiments, the power division ratio of the power divider may be configured by configuring the characteristic impedance of the second transmission line 32*a* and the characteristic impedance of the decoupling transmission line 33*a*. For example, a relationship among the characteristic impedance $Z_2$ of the second transmission line 32*a*, the characteristic impedance $Z_1$ of the first transmission line 31*a*, and the power division ratio (the function about the strength $S'_{12}$ of the initial isolation degree) may satisfy the above formula (23). A relationship among the characteristic impedance $Z_3$ of the decoupling transmission line 33*a*, the characteristic impedance $Z_1$ of the first transmission line 31*a*, and the power division ratio (that is, the function about the strength $S'_{12}$ of the initial isolation) may satisfy the above formula (24).

As described in the above embodiments of the antenna array, the characteristic impedances of the transmission lines may meet requirements by configuring line widths of the transmission lines. For example, the line width of the second transmission line 32*a* may be configured to allow the second transmission line 32*a* to satisfy the required characteristic impedance $Z_2$ described above. The line width of the decoupling transmission line 33*a* may be configured to allow the decoupling transmission line 33*a* to satisfy the required characteristic impedance $Z_3$ described above.

The decoupling transmission line 33 and the first decoupling network 30 may be arranged on a same layer of the third substrate 63. For example, the decoupling transmission line 33 and the first decoupling network 30 may be arranged on the sixth prepreg layer or on the fifth prepreg layer of the third substrate 63. The sixth prepreg layer is close to the RF chip 64, and the fifth prepreg layer is in a middle of the three layers of the prepreg of the third substrate 63. As shown in FIG. 8, the decoupling transmission line 33 and the first decoupling network 30 may be arranged on the fifth prepreg of the third substrate 63. That is, the decoupling transmission line 33 and the first decoupling network 30 may be arranged the same layer as the fifth metal layer 666. The first transmission line 31*a* and the second transmission line 32*a* of the first decoupling network 30, and the decoupling transmission line 33 may all extend and form patterns on the layer where the decoupling transmission line is located. The first transmission line 31*a* forms a first pattern, and the second transmission line 32*a* forms a second pattern. In some embodiments, the decoupling transmission line 33*a* forms a bent pattern or a curved pattern on the layer of the third substrate, and the bent pattern or the curved pattern is arranged between adjacent decoupling networks. In an embodiment, the decoupling transmission line 33*a* may be formed on the layer where the fifth metal layer 666 is located, and the decoupling transmission line 33*a* has a length satisfying a required length $d_5$ described above. Understandably, when a linear distance between a feeder corresponding to the first antenna unit and a feeder corresponding to the second antenna unit adjacent to the first antenna unit is less than $d_5$, the decoupling transmission line 33*a* may form the bent pattern to meet the requirement for the length (as shown in FIG. 7). In some embodiments, the decoupling transmission line 33*a* may also be in the curved pattern. In the present disclosure, the first decoupling network 30 and the second decoupling network 30' may be located at a different layer from the layer where the first surface radiating sheet 11*a* and the second surface radiating sheet 21*a*, or the first inner radiating sheet 12*a* and the second inner radiating sheet 22*a*. As shown in FIG. 8, the decoupling transmission line 33*a* may be arranged below the antenna unit 10*a* and the antenna unit 20*a*. For example, the decoupling transmission line 33*a* may be arranged in the third substrate 63. As shown in FIG. 8, the first decoupling network 30 and the second decoupling network 30', the decoupling transmission line 33 connected between the first decoupling network 30 and the second decoupling network 30' may be located on the same layer as the fifth metal layer 666, i.e., a layer between the fourth prepreg layer and the fifth prepreg layer of the third substrate 63. In the three layers of the prepregs of the third substrate 63, the fourth prepreg layer is the closest to the ground layer 665, and the fifth prepreg layer is adjacent to the fourth prepreg layer. It can be understood that, in some other embodiments, the first decoupling network 30, the second decoupling network 30', and the decoupling transmission line 33 connected between the first decoupling network 30 and the second decoupling network 30' may also be in the same layer such as the sixth metal layer 667 or the seventh metal layer 668.

The decoupling transmission line 33*a* may also be arranged in a different layer. For example, a part of the decoupling transmission line 33*a* may be distributed in a layer where the fifth metal layer 666 is located, and the other part of the decoupling transmission line 33*a* may be distributed in a layer where the sixth metal layer 667 is located through a via. Alternately, a first part of the decoupling transmission line 33*a* may be distributed in the layer where the fifth metal layer 666 is located, a second part may be distributed in the layer where the sixth metal layer 667 is located through the via, and a third part may be distributed in a layer where the seventh metal layer 668 is located through the via.

In some embodiments, the characteristic impedance of the decoupling transmission line 33*a* may vary gradually. The characteristic impedance of the decoupling transmission line 33*a* may gradually change from both ends of the decoupling transmission line 33*a* to a middle position of the decoupling transmission line 33*a*. Changes of the characteristic impedances of the transmission lines may be realized by changing the line widths of the transmission lines. In some embodiments, from the two ends of the decoupling transmission line 33*a* to the middle position of the decoupling transmission line 33*a*, the line width of the decoupling transmission line 33*a* may gradually vary. In some embodiments, from the two ends of the decoupling transmission line 33*a* to the middle position, the line width of the decoupling transmission line 33*a* may vary step by step. For example, as shown in FIG. 7, the decoupling transmission line 33*a* may include a first segment 331*a*, a second segment 332*a*, a third segment 333*a*, a fourth segment 334*a*, and a fifth segment 335*a* connected in sequence. In some embodiments, each segment may have a uniform width. A width of the first segment 331*a* may be the same with a width of the fifth segment 335*a*. A width of the second segment 332*a* may be the same with a width of the fourth segment 334*a*. The width of the first segment 331*a* may be less than the width of the second segment 332*a*, and the width of the second segment 332*a* may be less than a width of the third segment 333*a*. The width of the fifth segment 335*a* may be less than the width of the fourth segment 334*a*, and the width of the fourth segment 334*a* may be less than the width of the third segment 333*a*. Therefore, from the first segment 331*a* to the second segment 332*a* and further to the third segment 333*a*, and from the fifth segment 335*a* to the fourth segment 334*a* and further to the third segment 333*a*, a small characteristic impedance may vary step by step until the characteristic impedance of the third segment 333*a* may reach 50Ω. Based on a multi-step impedance variation, appropriate characteristic impedances of the decoupling transmission line 33*a* may achieve a full match on multiple frequency points. When the number of matching nodes is increased, the frequency points where matches occur may be also increased accordingly, and bandwidths may be also widened accordingly. In some embodiments, the characteristic impedance of the first segment 331*a* and the characteristic impedance of the fifth segment 335*a* may be calculated based on the power division ratio of the power divider, as shown in the above formula (24). The width of the first segment 331*a* may be calculated based on the characteristic impedance of the first segment 331*a*. The characteristic impedance of the third segment 333*a* may be 50Ω, and the width of the third segment 333*a* may be also calculated based on the characteristic impedance of the third segment 333*a*. The characteristic impedance of the second segment 332*a* and the characteristic impedance of the fourth segment 334*a* may be equal to a square root of a product of the characteristic impedance of the first segment 331*a* and the characteristic impedance of the third segment 333*a*. The width of the second segment 332*a* may be calculated based on a calculated characteristic impedance of the second segment 332*a*. Certainly, in some embodiments, the width of the decoupling transmission line 33*a* may also vary in four or more stages. It can be understood that the width of the decoupling transmission line 33*a* may also vary continuously.

In some embodiments, a branch 336*a* (as shown in FIG. 7) may also be arranged on the decoupling transmission line 33*a*. The branch 336*a* may be arranged on the third segment 333*a* to adjust transmission characteristics of the decoupling networks.

A length of the second transmission line 32*a* may be ¾λ. In the embodiment shown in FIG. 7, the second pattern formed by the second transmission line 32*a* on the layer where the decoupling transmission line 33 is located is bent or curved towards a direction away from the decoupling transmission line 33.

The antenna unit 10*a* and the antenna unit 20*a*, the first decoupling network 30 and the second decoupling network 30', and the decoupling transmission line 33 are described in the above. However, it is easy to understand that the antenna unit 20*a* and the antenna unit 10*b* may be configured with the decoupling structure of the present disclosure. Alternatively, the antenna unit 10*b* and the antenna unit 20*b* may also be configured with the decoupling structure of the present disclosure (as shown in FIG. 7). For example, a third decoupling network 35, a fourth decoupling network 35', and a decoupling transmission line 33*a*' connected between the third decoupling network 35 and the fourth decoupling network 35' may be arranged for the antenna unit 10*b* and the antenna unit 20*a*'. The third decoupling network 35 may be the same as or similar to the first decoupling network 30 described above, and the fourth decoupling network 35' may be the same as or similar to the second decoupling network 30' described above. The third decoupling transmission line 33*a*' may be the same as or similar to the decoupling transmission line 33*a* described above.

When more than three antenna units are adopted as shown in FIG. 7, the decoupling networks and the decoupling transmission lines may also be distributed in different layers. For example, the first decoupling network 30, the second decoupling network 30', and the decoupling transmission line 33*a* connected between the first decoupling network 30 and the second decoupling network 30' may be distributed in the layer where the fifth metal layer 666 is located as shown in FIG. 8. The third decoupling network 35, the fourth decoupling networks 35', and the decoupling transmission lines 33*a*' connected between the third decoupling network 35 and the fourth decoupling networks 35 may be distributed in the layer where the sixth metal layer 667 is located as shown in FIG. 8.

Figure 9:
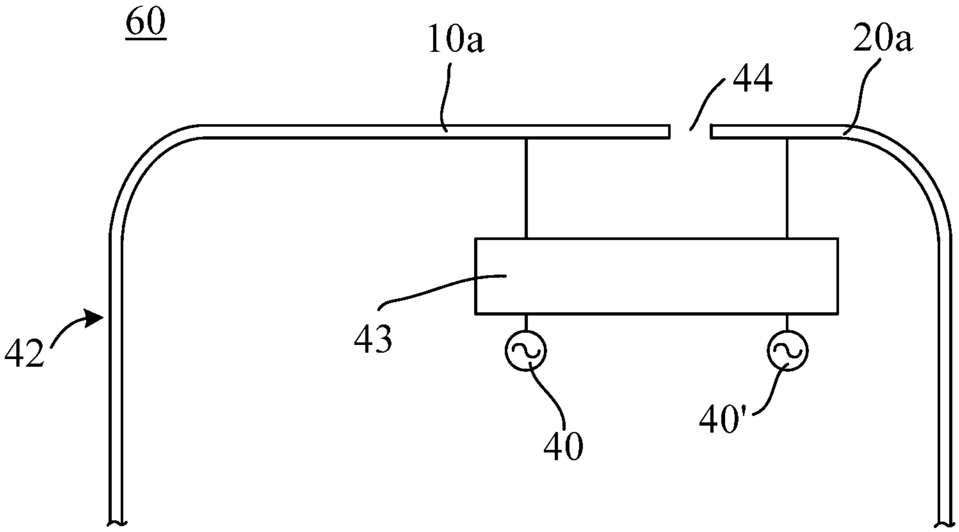
FIG. 9 is a schematic view of the antenna apparatus according to another embodiment of the present disclosure.

As shown in FIG. 9, it is a schematic view of the antenna apparatus according to another embodiment of the present disclosure. In some embodiments of the present embodiment, the antenna apparatus 60 may be the mobile phone. A top portion of a middle frame 42 of the mobile phone may be divided into two sections through a slot 44. One of the two sections may be configured as the first antenna 10*a*, the other one of the two sections may be configured as the second antenna 20*a*. A circuit board 43 may be arranged in the middle frame 42. The first decoupling network 30, the second decoupling network 30', and the decoupling transmission line 33 (see FIG. 3) described above in the present disclosure may be arranged on the circuit board 43. The first feed source 40 and the second feed source 40' may be connected to the circuit board 43. The circuit board 43 may be connected to the first antenna 10*a* and the second antenna 20*a*. The slot 44 may generally not be arranged at the middle portion. For example, the slot 44 may be arranged close to a left side or a right side of the middle frame 42.

Figure 10:
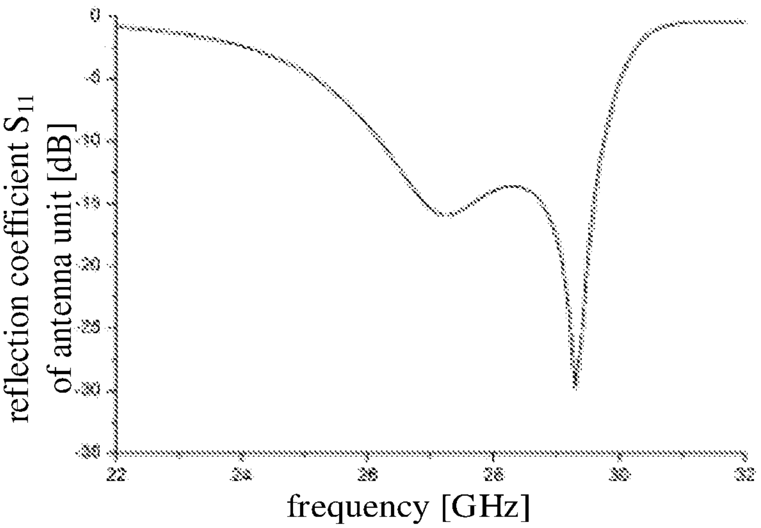
FIG. 10 shows a curve diagram of a reflection coefficient of an antenna unit before the antenna unit is connected to a decoupling network.
Figure 11:
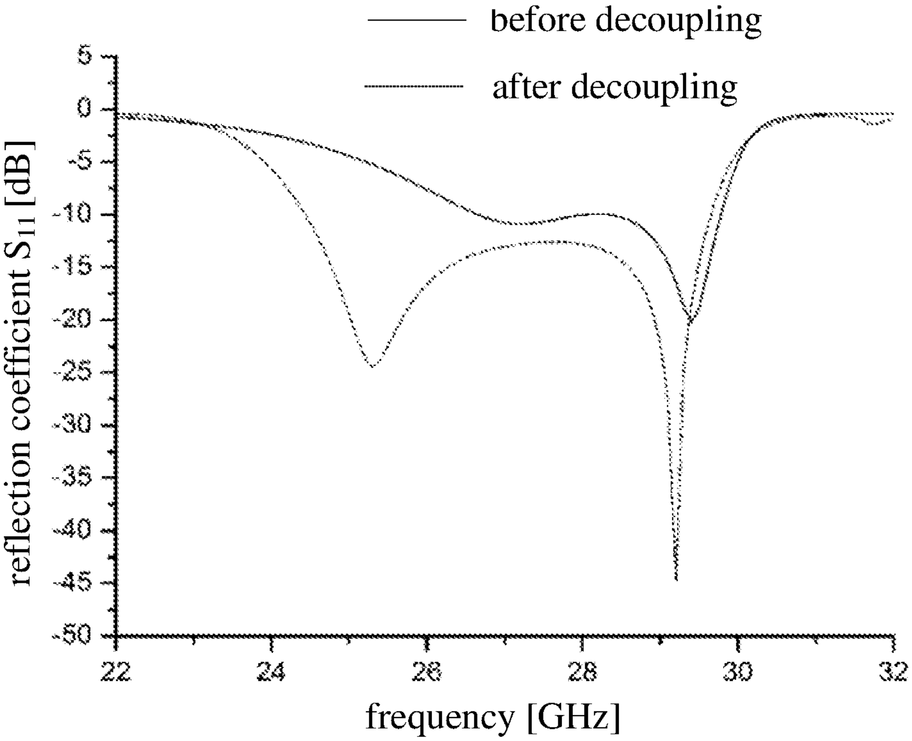
FIG. 11 shows a comparison curve diagram of a curve of the reflection coefficient of the antenna unit before the antenna unit is connected to the decoupling network and a curve of a reflection coefficient of the antenna unit after the antenna unit is connected to the decoupling network.

In the present embodiment, performing a decoupling design for the quadruple linear array shown in FIG. 6 and FIG. 7 is taken as an example, and a center operating frequency of the quadruple linear array may be 28 GHz. It is pointed out herein that based on a stipulation of a 3GPP TS 38.101 protocol, frequencies between 24.25 GHz and 52.6 GHz may be usually called millimeter (mm) waves. Therefore, the decoupling structure provided in the present disclosure may be a mm wave array antenna decoupling structure. Before performing the decoupling design, the reflection coefficient of the quadruple linear array is shown in FIG. 10. FIG. 11 shows a comparison curve diagram of a curve of the reflection coefficient of the antenna unit before the antenna unit is connected to the decoupling network and a curve of a reflection coefficient of the antenna unit after the antenna unit is connected to the decoupling network. It can be seen from FIG. 11 that due to the coupling effect, before being decoupled, a −10 dB operating bandwidth of the units in the array is 26.68 GHz-29.78 GHz, a −6 dB operating bandwidth is 25.57 GHz-29.94 GHz. After being decoupled, the −6 dB operating bandwidth is 24.03 GHz-29.85 GHz. That is, the operating bandwidth is broadened, such that the matching characteristics of the antennas may be significantly improved.

Figure 12:
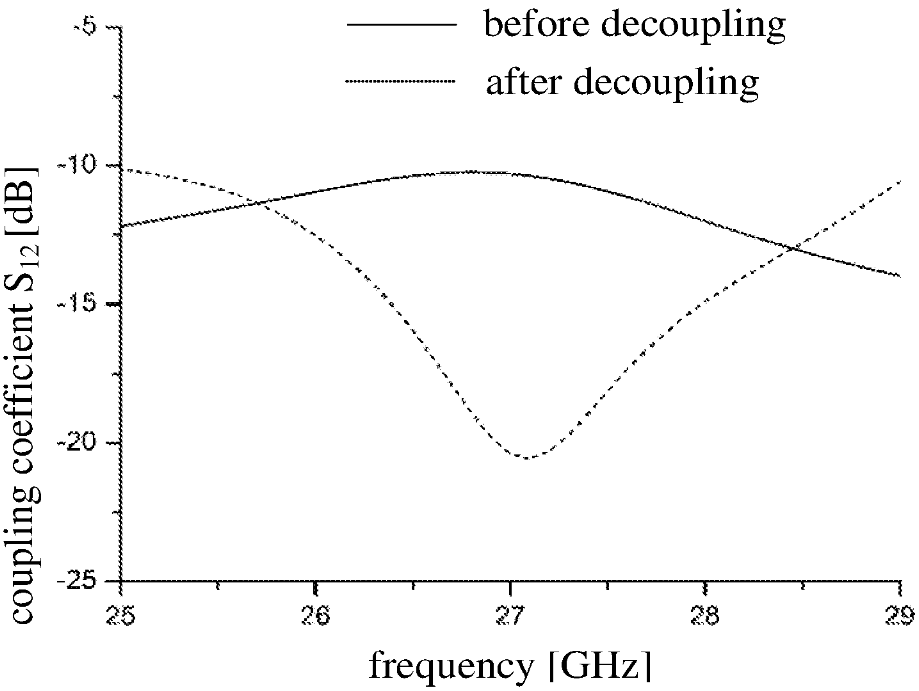
FIG. 12 shows a comparison curve diagram of a curve of a coupling coefficient of the antenna unit before the antenna unit is connected to the decoupling network and a curve of a coupling coefficient of the antenna unit after the antenna unit is connected to the decoupling network.

FIG. 12 shows a comparison curve diagram of a curve of a coupling coefficient of the antenna unit before the antenna unit is connected to the decoupling network and a curve of a coupling coefficient of the antenna unit after the antenna unit is connected to the decoupling network. It can be seen from FIG. 12 that within a frequency band from 25.7 GHz to 28.4 GHZ, the coupling coefficient is reduced relative to the frequency band before, and a suppression for a broad-band mutual coupling may be achieved. At a frequency of 27 GHz, affected by the coupling effect, the coupling coefficient between the units before being decoupled is −10.2 dB, the coupling coefficient between the antennas is reduced by 11 dB after being decoupled, such that the coupling effect between the units may be effectively suppressed.

Figure 13:
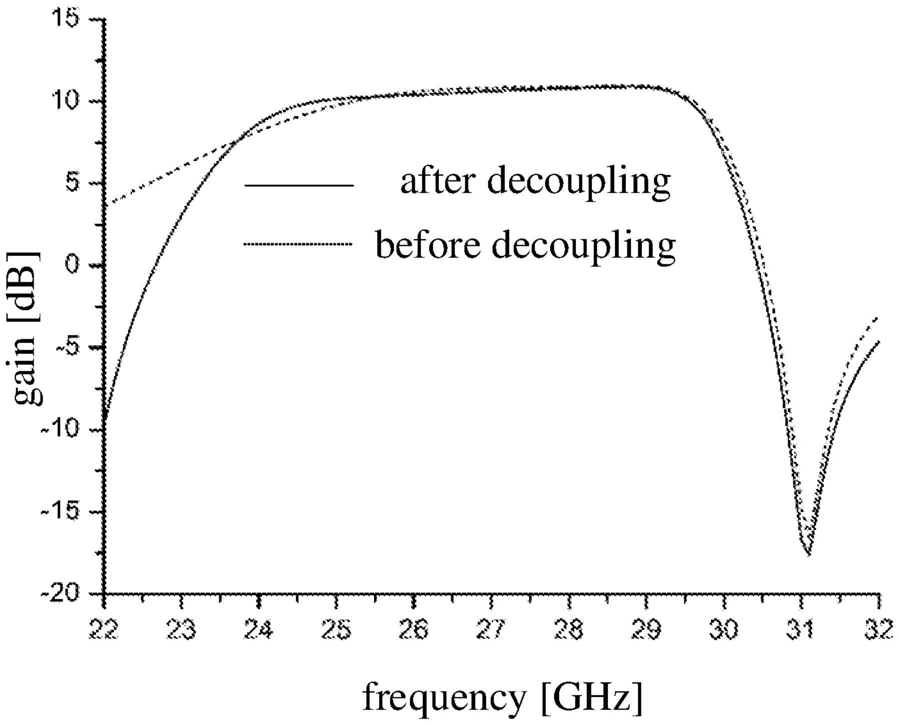
FIG. 13 shows a comparison diagram of a gain-frequency curve of the antenna apparatus before the antenna apparatus is connected to the decoupling network and a gain-frequency curve of the antenna apparatus after the antenna apparatus is connected to the decoupling network when a wave beam is scanned to 0°.
Figure 14:
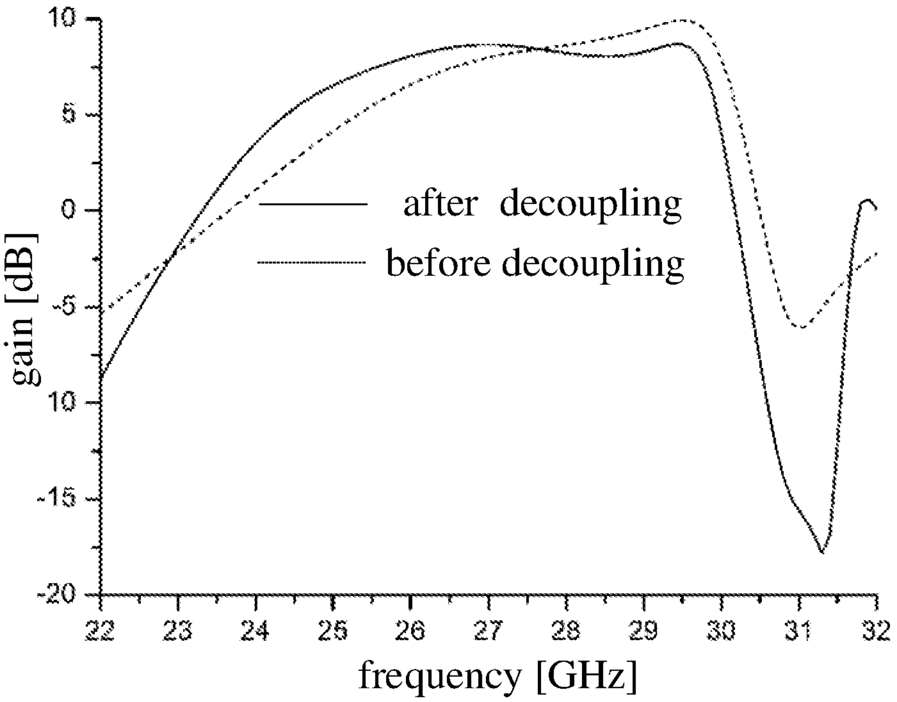
FIG. 14 shows a comparison diagram of a gain-frequency curve of the antenna apparatus before the antenna apparatus is connected to the decoupling network and a gain-frequency curve of the antenna apparatus after the antenna apparatus is connected to the decoupling network when the wave beam is scanned to 45°.
Figure 15:
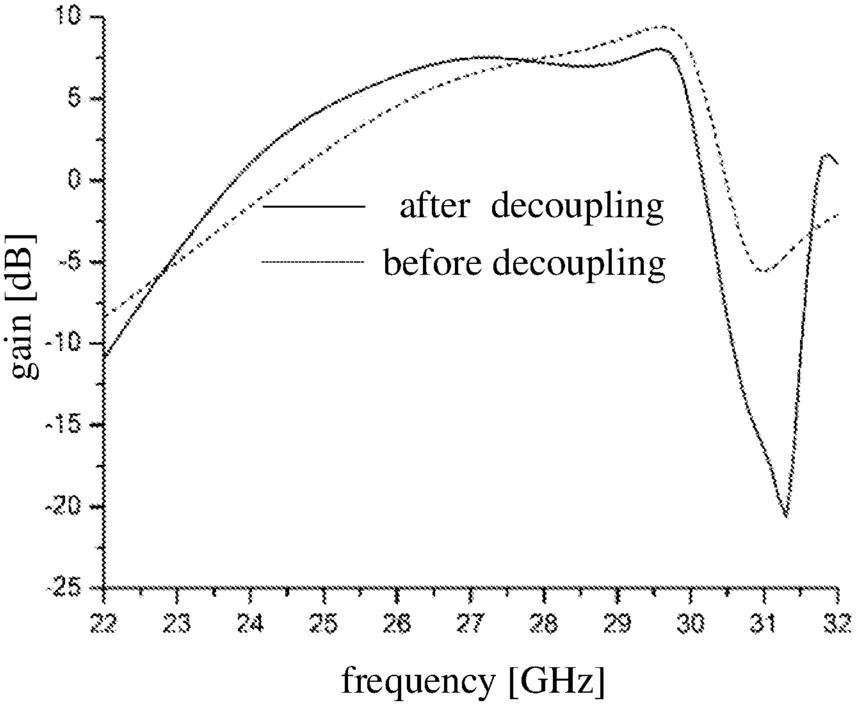
FIG. 15 shows a comparison diagram of a gain-frequency curve of the antenna apparatus before the antenna apparatus is connected to the decoupling network and a gain-frequency curve of the antenna apparatus after the antenna apparatus is connected to the decoupling network when the wave beam is scanned to 50°.

FIG. 13 shows a comparison diagram of a gain-frequency curve of the antenna apparatus before the antenna apparatus is connected to the decoupling network and a gain-frequency curve of the antenna apparatus after the antenna apparatus is connected to the decoupling network when a wave beam is scanned to 0°. FIG. 14 shows a comparison diagram of a gain-frequency curve of the antenna apparatus before the antenna apparatus is connected to the decoupling network and a gain-frequency curve of the antenna apparatus after the antenna apparatus is connected to the decoupling network when the wave beam is scanned to 45°. FIG. 15 shows a comparison diagram of a gain-frequency curve of the antenna apparatus before the antenna apparatus is connected to the decoupling network and a gain-frequency curve of the antenna apparatus after the antenna apparatus is connected to the decoupling network when the wave beam is scanned to 50°. As shown in FIG. 13, when the wave beam is pointed to 0°, the gain after being decoupled is increased relative to the gain before being decoupled. Within a frequency range of 23.8 GHz-25.5 GHz, the gain is increased to the maximum value 0.68 db at 24.4 GHz. Within a frequency range of 25.5 GHz-29.4 GHz, the gain after being decoupled is substantially the same with the gain before being decoupled. As shown in FIG. 14, when the wave beam is pointed to 45°, in a frequency range of 23 GHz-27.6 GHz, the gain after being decoupled is increased relative to the gain before being decoupled, and the gain is increased to the maximum value 2.27 dB at 24.7 GHZ. As shown in FIG. 15, when the beam is pointed to 50°, in a frequency range of 22.9 GHZ-27.7 GHZ, the gain after being decoupled is increased relative to the gain before being decoupled, and the gain is increased to the maximum value 2.34 dB at 24.8 GHz. In this way, a radiation capability of the array antenna may be significantly improved.

In conclusion, in the antenna apparatus according to the present disclosure, a concept of the decoupling network is introduced under the antenna unit. A structure of the array antenna unit is not required to be changed, only a configuration for the length of the decoupling transmission line 33*a* and the S parameters of the decoupling networks is required, such that the coupling degree between the antenna unit 10 and the antenna unit 20 may be precisely defined. That is, the mutual coupling between the antenna units may be reduced, the scanning angle may be expanded, and the scanning gain may be improved. In addition, the power division ratio of the power divider may be calculated based on the strength of the isolation before being decoupled. Subsequently, the characteristic impedance of each transmission line in the power divider may be determined based on the formula. Further, the width of the transmission line corresponding to the characteristic impedance may be calculated, such that the power divider may be manufactured. Based on the method, the isolation degree of a multi-antenna system may be improved.

The above descriptions above are only some embodiments of the present disclosure. The patent scope of the present disclosure is not limited by the above descriptions. Any equivalent structure transformation or equivalent process transformation of the present disclosure made based on contents of the specification and the drawings of the present disclosure, or direct or indirect applications in other related technical fields, are all similarly included within a patent protection scope of the present disclosure.

What is claimed is:

1. An antenna apparatus, comprising:

a plurality of antenna units, spaced from each other;

a plurality of decoupling networks, corresponding to the plurality of antenna units one to one, wherein each of the decoupling networks comprises:

a first transmission line, an end of the first transmission line being configured to be connected to a radio frequency (RF) chip; and a second transmission line, the other end of the first transmission line being connected to an end of the second transmission line, a decoupling port being formed at a joint between the other end of the first transmission line and the end of the second transmission line, and the other end of the second transmission line being connected to a corresponding antenna unit; and a decoupling transmission line, connected between adjacent decoupling ports, wherein a length of the decoupling transmission line is determined based on a phase of an initial isolation degree between each two adjacent antenna units of the plurality of antenna units, and the initial isolation degree is an isolation degree when the adjacent antenna units are not connected to the decoupling networks; the decoupling transmission line comprises a first segment, a second segment, a third segment, a fourth segment and a fifth segment connected in sequence;

a width of the first segment is the same with a width of the fifth segment, and a width of the second segment is the same with a width of the fourth segment;

the width of the first segment is less than the width of the second segment, and the width of the second segment is less than a width of the third segment; and a width of the fifth segment is less than the width of the fourth segment, and the width of the fourth segment is less than the width of the third segment.

2. The antenna apparatus according to claim 1, further comprising:

a first substrate, the plurality of antenna units being arranged on the first substrate;

a second substrate; and a third substrate, the plurality of decoupling networks and the decoupling transmission line are arranged in the third substrate;

wherein the first substrate, the second substrate, and the third substrate are stacked in sequence.

3. The antenna apparatus according to claim 2, further comprising:

a plurality of feeders, corresponding to the plurality of antenna units one to one, each of the plurality of feeders comprises:

a first feeder; and a second feeder;

wherein each of the plurality of decoupling networks is connected between the first feeder and the second feeder;

wherein an end of the first feeder is arranged on a side of the third substrate away from the second substrate to be connected to the RF chip, and the other end of first feeder extends into the third substrate to be connected to the first transmission line, such that the first transmission line is connected to the RF chip;

wherein a part of the second feeder is arranged in the third substrate to be connected to the second transmission line, and the other part of the second feeder penetrates through the second substrate, such that the second transmission line is connected to the corresponding antenna unit.

4. The antenna apparatus according to claim 2, wherein the third substrate has a multi-layer structure, the decoupling transmission line is arranged on a layer of the third substrate, the first transmission line extends on the layer where the decoupling transmission line is located and forms a first pattern, and the second transmission line extends on the layer where the decoupling transmission line is located and forms a second pattern.

5. The antenna apparatus according to claim 4, wherein the decoupling transmission line forms a bent pattern or a curved pattern on the layer of the third substrate, and the bent pattern or the curved pattern is arranged between adjacent decoupling networks.

6. The antenna apparatus according to claim 4, wherein the second pattern formed by the second transmission line on the layer where the decoupling transmission line is located is bent or curved towards a direction away from the decoupling transmission line.

7. The antenna apparatus according to claim 2, wherein each of the plurality of antenna units comprises:

a surface radiating sheet, arranged on a surface of the first substrate away from the second substrate; and an inner radiating sheet, isolated from the surface radiating sheet and arranged corresponding to the surface radiating sheet, and arranged on a surface of the first substrate close to the second substrate.

8. The antenna apparatus according to claim 1, wherein a characteristic impedance of the decoupling transmission line changes gradually from both ends of the decoupling transmission line to a middle of the decoupling transmission line.

9. The antenna apparatus according to claim 1, wherein a coupling degree between the two adjacent antenna units is determined based on scattering parameters of the decoupling networks connected to the adjacent antenna units one to one and the length of the decoupling transmission line.

10. The antenna apparatus according to claim 1, wherein a coupling degree between adjacent antenna units is determined based on a length of the decoupling transmission line and scattering parameters of the decoupling networks corresponding to the adjacent antenna units.

11. The antenna apparatus according to claim 1, wherein a relationship among a coupling degree between the adjacent antenna units, the length of the decoupling transmission line, and scattering parameters of the decoupling networks corresponding to the adjacent antenna units satisfies the following formula:

$$S'_{12}S_{12}^2+S_{13}^2e^{-jkd_5}=\text{the coupling degree}$$

wherein $S'_{12}$ is a strength of the initial isolation degree between the adjacent antenna units; $S_{12}$ and $S_{13}$ are the scattering parameters of the decoupling networks corresponding to the adjacent antenna units; $d_5$ is the length of the decoupling transmission line, k is a wave number, e is a natural constant, and j is a symbol of an imaginary number.

12. The antenna apparatus according to claim 1, wherein the first transmission line, the second transmission line, and the decoupling transmission line form a power divider, and a relationship between a power division ratio of the power divider and a strength of the initial isolation degree and a relationship between the length of the decoupling transmission line and the phase of the initial isolation degree satisfy the following formula:

$$\begin{cases} |S'_{12}| = |S_{13}^2| / |S_{12}^2| \\ \phi'_{12} = \pi - kd_5 \end{cases}$$

wherein $S'_{12}$ is the strength of the initial isolation degree; $S_{12}$ and $S_{13}$ are scattering parameters of the decoupling networks;

$$\frac{S_{13}^2}{S_{12}^2}$$

is the power division ratio; $Ø'_{12}$ is the phase of the initial isolation degree; ds is the length of the decoupling transmission line, and k is a wave number.

13. The antenna apparatus according to claim 12, wherein a coupling degree between the two adjacent antenna units is allowed to be 0 by configuring the length of the decoupling transmission line and the power division ratio of the power divider.

14. The antenna apparatus according to claim 12, wherein a relationship among a characteristic impedance of the second transmission line, a characteristic impedance of the first transmission line, and the strength of the initial isolation degree satisfies the following formula:

$$Z_2=(1+|S'_{12}|)\times Z_1;$$

wherein $Z_1$ is the characteristic impedance of the first transmission line, and $Z_2$ is the characteristic impedance of the second transmission line.

15. The antenna apparatus according to claim 12, wherein a relationship among a characteristic impedance of the decoupling transmission line, the characteristic impedance of the first transmission line, and the strength of the initial isolation degree satisfies the following formula:

$$Z_3 = \left(1 + \frac{1}{|S_{12}|}\right) \times Z_1;$$

wherein $Z_1$ is the characteristic impedance of the first transmission line, and $Z_3$ is the characteristic impedance of the decoupling transmission line.

16. The antenna apparatus according to claim 1, wherein the plurality of antenna units have the same shape, and the plurality of decoupling networks are configured to have the same scattering parameters.

17. An electronic device, comprising:

a housing, a display screen assembly, connected to the housing, wherein an accommodating space is defined by the housing and the display screen assembly;

an RF chip, arranged in the accommodating space; and an antenna apparatus, at least partially arranged in the accommodating space, and comprising:

a plurality of antenna units, spaced from each other;

a plurality of decoupling networks, corresponding to the plurality of antenna units one to one, wherein each of the decoupling networks comprises:

a first transmission line, an end of the first transmission line being configured to be connected to the RF chip; and a second transmission line, the other end of the first transmission line being connected to an end of the second transmission line, a decoupling port being formed at a joint between the other end of the first transmission line and the end of the second transmission line, and the other end of the second transmission line being connected to a corresponding antenna unit; and a decoupling transmission line, connected between adjacent decoupling ports; the decoupling transmission line comprises a first segment, a second segment, a third segment, a fourth segment and a fifth segment connected in sequence;

a width of the first segment is the same with a width of the fifth segment, and a width of the second segment is the same with a width of the fourth segment;

the width of the first segment is less than the width of the second segment, and the width of the second segment is less than a width of the third segment; and a width of the fifth segment is less than the width of the fourth segment, and the width of the fourth segment is less than the width of the third segment.

18. The electronic device according to claim 17, wherein the antenna apparatus comprises:

a first substrate, the plurality of antenna units being arranged on the first substrate;

a second substrate; and a third substrate, the plurality of decoupling networks and the decoupling transmission line being arranged in the third substrate;

wherein the first substrate, the second substrate, and the third substrate are stacked in sequence.

19. The electronic device according to claim 18, wherein the RF chip is arranged on a side of the third substrate away from the second substrate.

* * * * *